(12) United States Patent
Tamai et al.

(10) Patent No.: US 9,048,770 B2
(45) Date of Patent: Jun. 2, 2015

(54) SYNCHRONOUS MACHINE STARTING DEVICE

(75) Inventors: Shinzo Tamai, Minato-ku (JP); Hisanori Taguchi, Minato-ku (JP); Yasuhiko Hosokawa, Minato-ku (JP); Akinobu Ando, Minato-ku (JP)

(73) Assignee: TOSHIBA MITSUBISHI-ELECTRIC INDUSTRIAL SYSTEMS CORPORATION, Tokyo (JP)

( * ) Notice: Subject to any disclaimer, the term of this patent is extended or adjusted under 35 U.S.C. 154(b) by 251 days.

(21) Appl. No.: 13/878,836

(22) PCT Filed: Oct. 15, 2010

(86) PCT No.: PCT/JP2010/068178
§ 371 (c)(1),
(2), (4) Date: Apr. 11, 2013

(87) PCT Pub. No.: WO2012/049770
PCT Pub. Date: Apr. 19, 2012

(65) Prior Publication Data
US 2013/0193884 A1 Aug. 1, 2013

(51) Int. Cl.
*H02P 1/46* (2006.01)
*H02P 6/20* (2006.01)
(Continued)

(52) U.S. Cl.
CPC .. *H02P 6/20* (2013.01); *H02P 1/46* (2013.01); *H02P 21/0032* (2013.01); *H02P 21/146* (2013.01); *H02P 21/0039* (2013.01)

(58) Field of Classification Search
CPC ............. H02P 1/46; H02P 1/146; H02P 1/14; H02P 6/10

USPC .......... 318/700, 400.02, 400.32, 400.35, 727, 318/798, 799
See application file for complete search history.

(56) References Cited

U.S. PATENT DOCUMENTS 6,462,492 B1* 10/2002 Sakamoto et al. ........ 318/400.32
6,894,450 B2* 5/2005 Cheng et al. ............. 318/400.09
(Continued)

FOREIGN PATENT DOCUMENTS

JP 2 211079 8/1990
JP 2006 271038 10/2006
(Continued)

OTHER PUBLICATIONS

International Search Report Issued Nov. 16, 2010 in PCT/JP10/68178 Filed Oct. 15, 2010.

*Primary Examiner* — Rina Duda
(74) *Attorney, Agent, or Firm* — Oblon, McClelland, Maier & Neustadt, L.L.P.

(57) ABSTRACT

In a synchronous machine starting device, a timing detection unit outputs a first position signal indicating a timing at which a value of an armature voltage passes a prescribed reference level. A feedback operation unit calculates an error of an estimated phase based on the estimated phase, an estimated rotational speed of a rotor, an armature voltage, and an armature current, updates the estimated phase and the estimated rotational speed based on the calculated phase error, and outputs a second position signal indicating the updated estimated phase. A frequency detection unit detects a current rotational speed of the rotor based on the first position signal, as an initial value of the estimated rotational speed. A selector circuit selects the first position signal and the second position signal in this order, and outputs a selected position signal to the power conversion control unit.

20 Claims, 17 Drawing Sheets

(51) Int. Cl.
*H02P 21/00* (2006.01)
*H02P 21/14* (2006.01)

(56) References Cited

U.S. PATENT DOCUMENTS

| | | | |
|---|---|---|---|
| 7,180,263 B2 * | 2/2007 | Maeda et al. | 318/719 |
| 7,348,749 B2 * | 3/2008 | Ide et al. | 318/599 |
| 8,362,730 B2 | 1/2013 | Tamai et al. | |
| 2003/0030404 A1 * | 2/2003 | Iwaji et al. | 318/700 |
| 2008/0061728 A1 * | 3/2008 | Tomigashi | 318/768 |
| 2011/0181220 A1 | 7/2011 | Tamai et al. | |
| 2011/0254491 A1 | 10/2011 | Tamai et al. | |
| 2012/0161688 A1 | 6/2012 | Tamai et al. | |

FOREIGN PATENT DOCUMENTS

| | | |
|---|---|---|
| JP | 2007 37274 | 2/2007 |
| WO | 2010 038282 | 4/2010 |

* cited by examiner

SYNCHRONOUS MACHINE STARTING DEVICE

TECHNICAL FIELD

The present invention relates to a synchronous machine starting device, and more particularly to a synchronous machine starting device that detects a rotor position of a synchronous machine.

BACKGROUND ART

Synchronous machine starting devices for starting synchronous machines such as generators and motors have been developed. Conventionally, a synchronous machine starting device uses a mechanical distributor that detects the position of a rotor of a synchronous machine, for example, by a proximity switch. However, the mechanical distributor is fragile and is susceptible to noise due to a large amount of wiring.

The inventors of the present application invented a synchronous machine starting device that does not require such a mechanical distributor, and filed it as an international patent application (see WO2010/038282 (PTL 1)). A synchronous machine starting device according to one embodiment described in PTL 1 will be described hereinafter.

This synchronous machine starting device includes a power conversion unit, an AC voltage detector, an AC current detector, a rotor position detection unit, and a power conversion control portion. The AC voltage detector and AC current detector detect three-phase AC voltage and three-phase AC current, respectively, supplied to or generated at an armature of a synchronous machine, and output the detection values to the rotor position detecting unit. The rotor position detection unit includes a zero cross detection unit, a first PLL (Phase Locked Loop) unit, a second PLL unit, and a selector circuit. The zero cross detection unit performs zero cross detection of AC voltage detected by the AC voltage detector. The first PLL unit outputs a position signal that is an AC signal having a prescribed frequency. Here, the prescribed frequency is a frequency corresponding to a predetermined rotational speed of the rotor during standby of the synchronous machine. The first PLL unit adjusts the phase of the position signal based on the detection signal received from the zero cross detection unit. The second PLL unit calculates an estimated phase indicating the rotor position of the synchronous machine by performing feedback operation so as to reduce an error of induction voltage of the armature, based on the detection values received from the AC voltage detector and AC current detector, and outputs a position signal obtained from the calculated estimated phase. The selector circuit selects, at the time of starting of the synchronous machine, the detection signal from the zero cross detection unit, the position signal from the first PLL unit, and the position signal from the second PLL unit in this order, and outputs the selected position signal as a rotor position signal indicating the rotor position of the synchronous machine.

CITATION LIST

Patent Literature

PTL 1: WO2010/038282

SUMMARY OF INVENTION

Technical Problem

The rated rotational speed of the synchronous machine is 3000 to 3600 rpm, for example, whereas the rotational speed during standby is low, for example, several rpm. When the synchronous machine is stopped, the rotor of the synchronous machine continues to rotate by inertia for a while, and thus, does not immediately return to the rotational speed during standby.

Since the above-described synchronous machine starting device is aimed at stably starting the synchronous machine in the standby state, the synchronous machine cannot be restarted for a while after being stopped, and needs to be restarted after it has returned to the rotational speed in the standby state.

Accordingly, an object of the present invention is to provide a synchronous machine starting device capable of stably starting a synchronous machine not only in the standby state but also when the synchronous machine has not returned to the rotational speed in the standby state after stopping of the synchronous machine.

Solution to Problem

A synchronous machine starting device according to a first aspect of this invention includes a power conversion unit, an AC voltage detection unit, an AC current detection unit, a rotor position detection unit, and a power conversion control portion. The power conversion unit converts supplied power into AC power and supplies the AC power to an armature of a synchronous machine. The AC voltage detection unit detects AC voltage supplied to or generated at the armature of the synchronous machine. The AC current detection unit detects AC current supplied to or generated at the armature of the synchronous machine. The rotor position detection unit detects a rotor position of the synchronous machine, based on the detected AC voltage and AC current. The power conversion control portion controls the power conversion unit based on the detected rotor position. The above-described rotor position detection unit includes a timing detection unit, a feedback operation unit, a frequency detection unit, and a selector circuit. The timing detection unit outputs a first position signal indicating a timing at which a value of the detected AC voltage passes a prescribed reference level. The feedback operation unit calculates an error of an estimated phase based on the estimated phase indicating the rotor position, an estimated rotational speed of the rotor of the synchronous machine, as well as the detected AC voltage and AC current, updates the estimated phase and the estimated rotational speed based on the calculated phase error, and outputs a second position signal indicating the updated estimated phase. The frequency detection unit detects a first frequency corresponding to a rotational speed of the rotor of the synchronous machine at the time of starting of the synchronous machine starting device based on the first position signal, for use as an initial frequency corresponding to an initial value of the estimated rotational speed. The selector circuit selects the first position signal or a position signal obtained based on the first position signal, outputs the selected signal to the power conversion control portion as a signal indicating the rotor position of the synchronous machine, releases selection of the first position signal or the position signal obtained based on the first position signal, and thereafter selects the second position signal for output to the power conversion control portion as a signal indicating the rotor position of the synchronous machine.

Preferably, the rotor position detection unit further includes an initial frequency selection unit for selecting either one of the above-described first frequency and a prescribed second frequency as the initial frequency. In this case, the second frequency is a frequency corresponding to a predetermined rotational speed of the rotor during standby of the synchronous machine. The initial frequency selection unit selects the first frequency where an absolute value of the detected AC voltage is a prescribed value or higher at the time of starting of the synchronous machine starting device. The initial frequency selection unit selects the second frequency where the absolute value of the detected AC voltage does not reach the prescribed value within a prescribed time at the time of starting of the synchronous machine starting device.

Alternatively, where the initial frequency selection unit for selecting the first or second frequency is included as described above, the initial frequency selection unit selects the first frequency where the number of times that the value of the detected AC voltage passes the reference level within a prescribed time is a prescribed number or greater at the time of starting of the synchronous machine starting device. The initial frequency selection unit selects the second frequency where the number of times that the value of the detected AC voltage passes the reference level within the prescribed time is smaller than a prescribed number at the time of starting of the synchronous machine starting device.

According to a second aspect of this invention, the above-described selector circuit according to the first aspect initially selects the first position signal for output to the power conversion control portion, and then selects the second position signal for output to the power conversion control portion.

According to a third aspect of this invention, the above-described rotor position detection unit according to the first aspect further includes an AC signal generation unit for outputting a third position signal that is an AC signal having the above-described initial frequency and having a phase adjusted to be synchronized with the first position signal. In the third aspect, the selector circuit selects the first position signal, the third position signal, and the second position signal in this order, and outputs the selected signal to the power conversion control portion.

According to a fourth aspect of this invention, the above-described rotor position detection unit according to the first aspect further includes an AC signal generation unit for outputting a third position signal that is an AC signal having the above-described initial frequency and having a phase adjusted to be synchronized with the first position signal. In the fourth aspect, the selector circuit initially selects the third position signal for output to the power conversion control portion, and then selects the second position signal for output to the power conversion control portion.

According to a fifth aspect of this invention, the above-described rotor position detection unit according to the first aspect further includes an AC signal generation unit for outputting a third position signal that is an AC signal having the above-described initial frequency and having a phase adjusted to be synchronized with the first position signal. In the fifth aspect, where an absolute value of the detected AC voltage is a prescribed value or higher at the time of starting of the synchronous machine starting device, the selector circuit initially selects the first position signal for output to the power conversion control portion, and then selects the second position signal for output to the power conversion control portion. Where the absolute value of the detected AC voltage does not reach the prescribed value within a prescribed time at the time of starting of the synchronous machine starting device, the selector circuit then selects the first position signal, the third position signal, and the second position signal in this order, for output to the power conversion control portion.

According to a sixth aspect of this invention, the above-described rotor position detection unit according to the first aspect further includes an AC signal generation unit for outputting a third position signal that is an AC signal having the above-described initial frequency and having a phase adjusted to be synchronized with the first position signal. In the sixth aspect, where the number of times that the value of the detected AC voltage passes the reference level within the prescribed time is a prescribed number or greater at the time of starting of the synchronous machine starting device, the selector circuit initially selects the first position signal for output to the power conversion control portion, and then selects the second position signal for output to the power conversion control portion. Where the number of times that the value of the detected AC voltage passes the reference level within the prescribed time is smaller than the prescribed number at the time of starting of the synchronous machine starting device, the selector circuit selects the first position signal, the third position signal, and the second position signal in this order, for output to the power conversion control portion.

In each of the above-described second to fourth aspects, preferably, the selector circuit selects the second position signal when the number of times that the value of the detected AC voltage passes the reference level within a prescribed time has exceeded a prescribed number.

In each of the above-described second to fourth aspects, preferably, the selector circuit selects the second position signal when an absolute value of the detected AC voltage has reached the prescribed value or higher.

In each of the above-described second to fourth aspects, preferably, the selector circuit selects the second position signal when a prescribed time has elapsed since the absolute value of the detected AC voltage reaches the prescribed value or higher.

In the above-described third aspect, preferably, the selector circuit selects the third position signal when the absolute value of the detected AC voltage has reached the prescribed value or higher.

In the above-described third aspect, preferably, the selector circuit selects the third position signal when the prescribed time has elapsed since the absolute value of the detected AC voltage reaches the prescribed value or higher.

In each of the above-described second and third aspects, preferably, the rotor position detection unit further includes a switching circuit for switching whether or not to output the first position signal to the feedback operation unit. The feedback operation unit adjusts a phase of the second position signal based on the first position signal received from the switching circuit. The selector circuit selects the second position signal after the feedback operation unit has adjusted the phase of the second position signal based on the first position signal.

In each of the above-described third and fourth aspects, preferably, the rotor position detection unit further includes a first switching circuit for switching whether or not to output the first position signal to the AC signal generation unit. The AC signal generation unit adjusts a phase of the third position signal based on the first position signal received from the first switching circuit. The selector circuit selects the third position signal after the AC signal generation unit has adjusted the phase of the third position signal based on the first position signal.

In each of the above-described third and fourth aspects, more preferably, the rotor position detection unit further includes a second switching circuit for switching whether or not to output the third position signal to the feedback operation unit. The feedback operation unit adjusts a phase of the second position signal based on the third position signal received from the second switching circuit. The selector circuit selects the second position signal after the feedback operation unit has adjusted the phase of the second position signal based on the third position signal.

Advantageous Effects of Invention

According to the present invention, a synchronous machine can be stably started not only in the standby state but also when it has not returned to the rotational speed in the standby state after stopping of the synchronous machine.

DESCRIPTION OF EMBODIMENTS

In the following, embodiments of the present invention will be described with reference to the figures. It is noted that in the figures the same or corresponding parts are denoted by the same reference signs, and a description thereof will not be repeated.

First Embodiment

Figure 1:
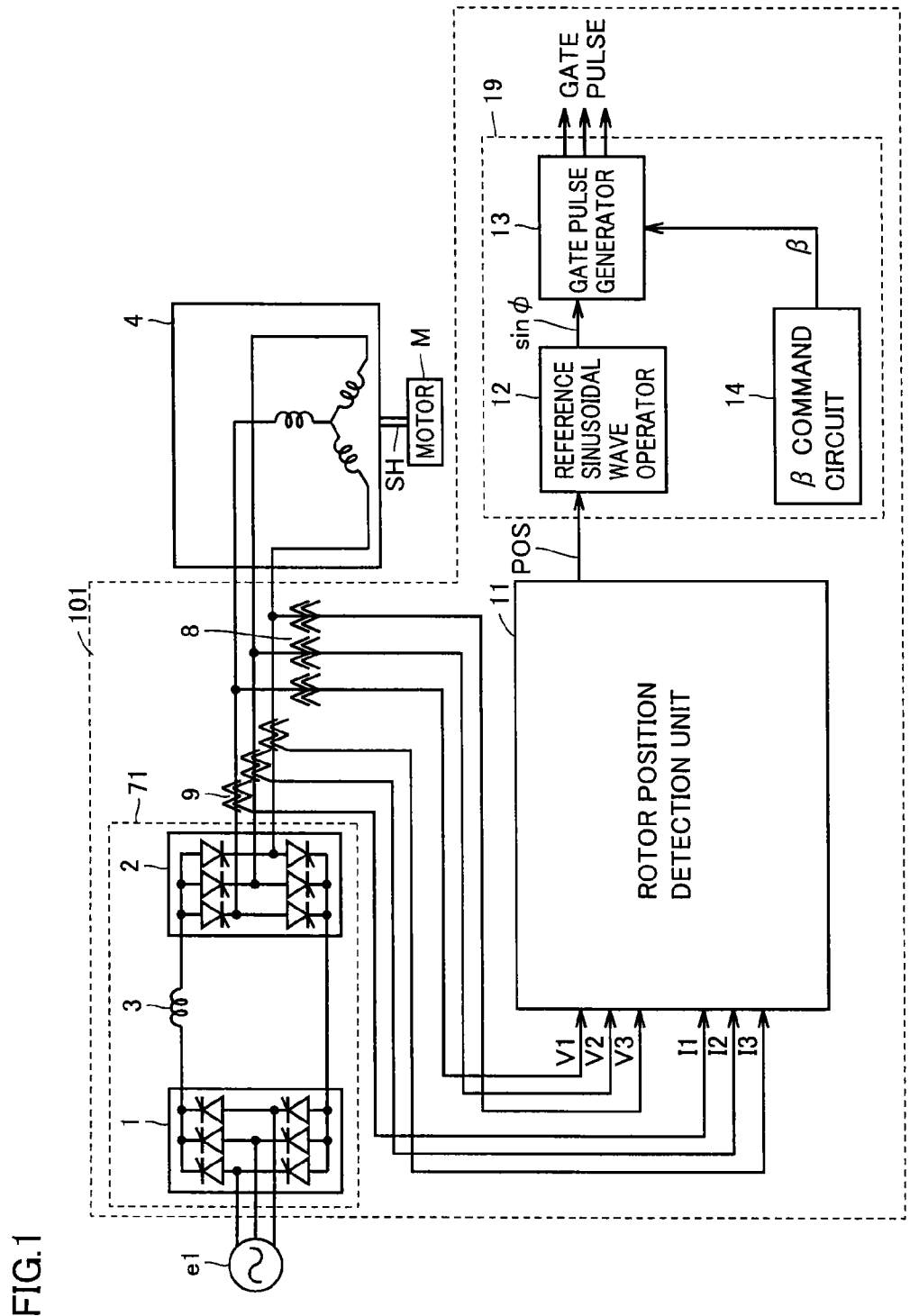
FIG. 1 is a diagram showing a configuration of a synchronous machine starting device in accordance with a first embodiment of the present invention.

FIG. 1 is a diagram showing a configuration of a synchronous machine starting device in accordance with a first embodiment of the present invention.

Referring to FIG. 1, a synchronous machine starting device 101 includes a power conversion unit 71, an AC voltage detector 8, an AC current detector 9, a rotor position detection unit 11, and an inverter control portion (power conversion control portion) 19. Power conversion unit 71 includes a converter 1, an inverter 2, and a DC reactor 3. Inverter control portion 19 includes a reference sinusoidal wave operator 12, a gate pulse generator 13, and a β command circuit 14.

A synchronous machine 4 and a motor M are connected with each other via a shaft SH. Synchronous machine 4 is, for example, a synchronous generator or a synchronous motor and has an armature and a rotor. Motor M rotates at a prescribed speed when synchronous machine 4 is on standby. The rotational speed is low, for example, a few rpm. By contrast, the rotational speed in the normal operation is 3000 rpm to 3600 rpm. Therefore, the voltage applied to the armature of synchronous machine 4 at the time of starting is as extremely small as one-thousandth of the steady operation, as described above, and is difficult to detect accurately because the detection voltage by AC voltage detector 8 is often distorted.

Converter 1 is formed of a plurality of elements such as thyristors and converts AC power from an AC power supply e1 into DC power.

Inverter 2 is formed of a plurality of elements such as thyristors and converts the DC power obtained from converter 1 into AC power for supply to the armature of synchronous machine 4, thereby driving synchronous machine 4.

Converter 1 and inverter 2 are connected with each other via DC reactor 3. The AC side of inverter 2 is connected to the armature of synchronous machine 4.

AC voltage detector 8 detects three-phase AC voltage supplied to or generated at the armature of synchronous machine 4 (hereinafter referred to as the "armature voltage") and outputs voltage detection values V1, V2, V3 to rotor position detection unit 11.

AC current detector 9 detects the three-phase AC current supplied to the armature of synchronous machine 4 (hereinafter referred to as the "armature current") and outputs current detection values I1, I2, I3 to rotor position detection unit 11.

Rotor position detection unit 11 detects the rotor position (phase) of synchronous machine 4, based on the detection values received from AC voltage detector 8 and AC current detector 9, and outputs a rotor position signal POS that indicates the rotor position of synchronous machine 4 to inverter control portion 19.

Inverter control portion 19 controls inverter 2 based on rotor position signal POS received from rotor position detection unit 11.

In inverter control portion 19, reference sinusoidal wave operator 12 outputs a reference sinusoidal wave sin φ based on position signal POS received from rotor position detection unit 11.

β command circuit 14 calculates and outputs a control-advance-angle command value β to gate pulse generator 13.

Gate pulse generator 13 outputs a gate pulse to each element in inverter 2, based on reference sinusoidal wave sin φ received form reference sinusoidal wave operator 12 and control lead angle command value β received from β command circuit 14.

Figure 2:
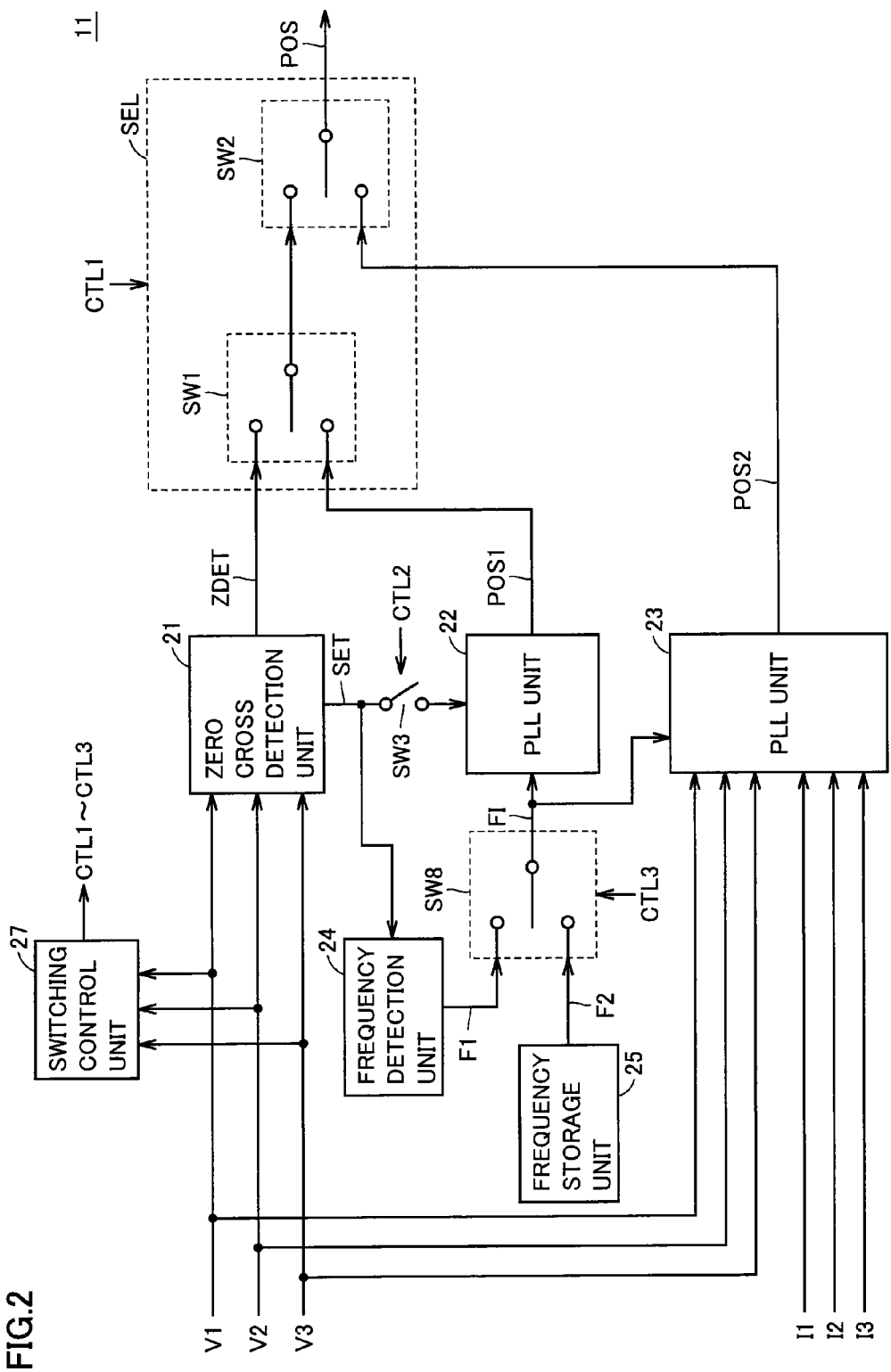
FIG. 2 is a diagram showing a configuration of a rotor position detection unit 11.

FIG. 2 is a diagram showing a configuration of rotor position detection unit 11.

Referring to FIG. 2, rotor position detection unit 11 includes a zero cross detection unit (timing detection unit) 21, a PLL (Phase Locked Loop) unit (AC signal generation unit) 22, a PLL unit (feedback operation unit) 23, a frequency detection unit 24, a frequency storage unit 25, a switching control unit 27, a selector circuit SEL, a switching circuit SW3, and a switching circuit (initial frequency selection unit) SW8. Selector circuit SEL includes switching circuits SW1 and SW2.

Zero cross detection unit 21 performs zero cross detection of the armature voltage of synchronous machine 4, based on voltage detection values V1, V2, V3 received from AC voltage detector 8. That is, zero cross detection unit 21 detects the timing at which the value of the armature voltage of synchronous machine 4 passes almost zero volt as a reference level, and outputs a detection signal ZDET indicating the detected timing. Zero cross detection unit 21 also outputs a detection signal SET indicating the phase of the rotor of synchronous machine 4 which is estimated from detection signal ZDET.

Switching circuit SW3 switches whether or not to output detection signal SET received from zero cross detection unit 21 to PLL unit 22. Switching by switching circuit SW3 is controlled by a control signal CTL2 output from switching control unit 27.

Frequency detection unit 24 detects a frequency F1 corresponding to a rotational speed of the rotor of synchronous machine 4 based on detection signal SET received from zero cross detection unit 21 at the time of starting of the synchronous machine starting device. Frequency F1 can be found as the reciprocal of a zero cross period of each phase, for example.

Frequency storage unit 25 stores a preset frequency F2. Frequency F2 is a frequency corresponding to a predetermined rotational speed of the rotor during standby of synchronous machine 4.

Switching circuit SW8 selects either one of frequency F1 detected by frequency detection unit 24 and frequency F2 stored in frequency storage unit 25, and inputs the selected frequency to PLL units 22 and 23 as an initial frequency FI. Selection of frequency F1 or F2 by switching circuit SW8 is controlled by a control signal CTL3 output from switching control unit 27.

PLL unit 22 outputs a position signal POS1 that is an AC signal having initial frequency FI input from switching circuit SW8. PLL unit 22 adjusts the phase of position signal POS1 based on detection signal SET received from switching circuit SW3.

Figure 3:
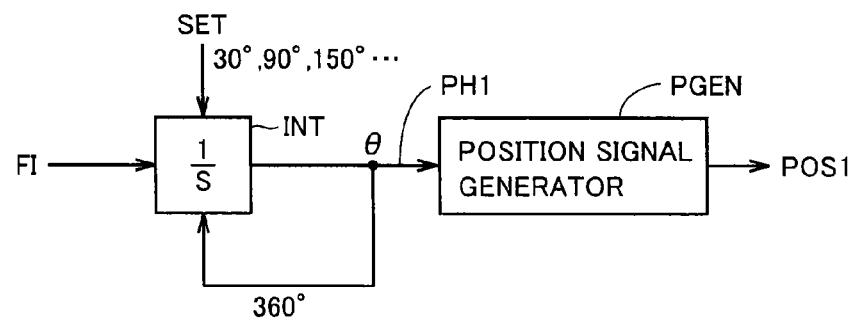
FIG. 3 is a diagram conceptually showing a configuration of a PLL unit 22.
Figure 4:
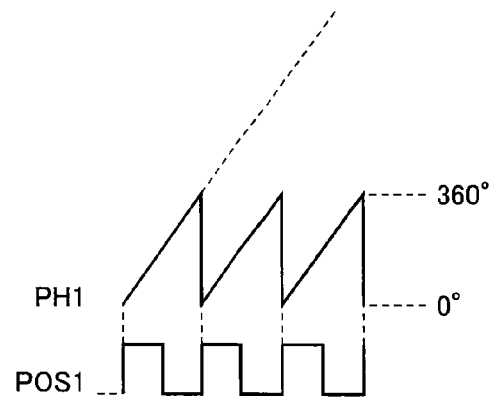
FIG. 4 is a diagram showing waveforms of a phase signal PH1 and a position signal POS1 generated by PLL unit 22.
Figure 5:
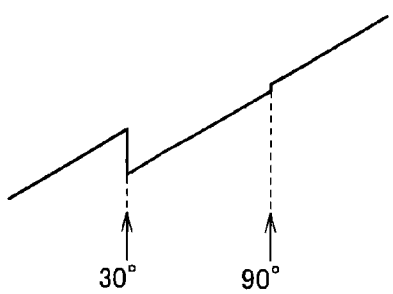
FIG. 5 is a diagram showing phase adjustment of phase signal PH1 by PLL unit 22.

FIG. 3 is a diagram conceptually showing a configuration of PLL unit 22. FIG. 4 is a diagram showing waveforms of a phase signal PH1 and position signal POS1 generated by PLL unit 22. FIG. 5 is a diagram showing phase adjustment of phase signal PH1 by PLL unit 22.

Referring to FIG. 3 to FIG. 5, PLL unit 22 includes an integrator INT and a position signal generator PGEN. Integrator INT integrates a value corresponding to initial frequency FI input from switching circuit SW8 and converts the value into a phase θ, which is then output as phase signal PH1. Integrator INT resets phase θ to 0° when phase θ attains 360°. That is, phase signal PH1 is an AC signal whose value changes from 0° to 360°. Integrator INT further corrects phase θ based on an angle such as 30°, 90°, or 150° indicated by detection signal SET received from zero cross detection unit 21. Position signal generator PGEN generates position signal POS1 based on the phase indicated by phase signal PH1 received from integrator INT. As shown in FIG. 4, for example, position signal generator PGEN converts phase signal PH1 into a pulse-like AC signal similar to that of the conventional mechanical distributor, and outputs the converted signal as position signal POS1. More specifically, for example, position signal POS1 rises from a logic low level to a logic high level when the phase indicated by phase signal PH1 changes from 360° to 0°, and falls from a logic high level to a logic low level when the phase indicated by phase signal PH1 changes to 180°.

In PLL unit 22, initially, phase θ starts to be increased at any given timing, and then phase θ is adjusted in response to detection signal SET to be synchronized with the armature voltage of synchronous machine 4. Thus, phase-matching is achieved.

Referring to FIG. 2 again, PLL unit 23 calculates an error of an estimated phase based on the estimated phase indicating the rotor position of synchronous machine 4 (i.e., a phase signal PH2 described later), an estimated rotational speed of the rotor of synchronous machine 4, voltage detection values V1, V2, V3 received from AC voltage detector 8, and current detection values I1, I2, I3 received from AC current detector 9, and then updates the estimated phase and the estimated rotational speed based on the calculated phase error. Then, PLL unit 23 outputs position signal POS2 obtained from the updated estimated phase, and also performs feedback operation of newly calculating an error of the estimated phase based on the updated estimated phase and the updated estimated rotational speed, as well as voltage detection values V1, V2, V3 newly received from AC voltage detector 8 and current detection values I1, I2, I3 newly received from AC current detector 9.

Figure 6:
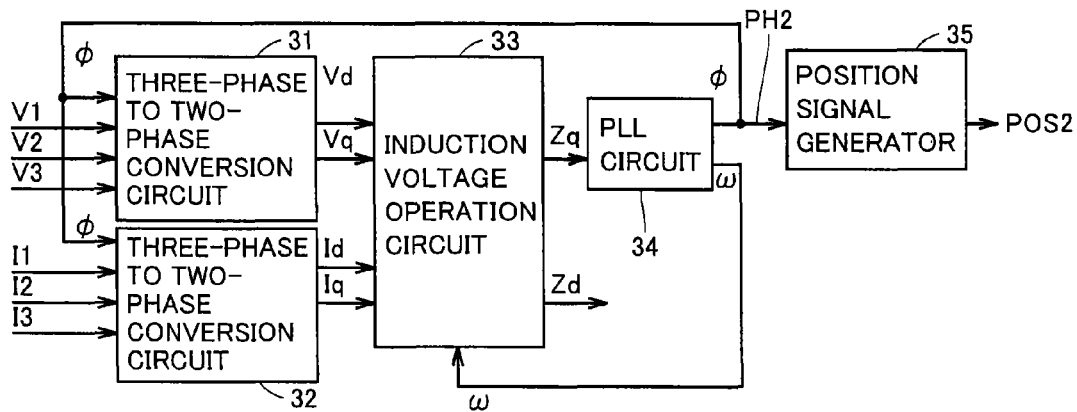
FIG. 6 is a diagram showing a configuration of a PLL unit 23.

FIG. 6 is a diagram showing a configuration of PLL unit 23.

Referring to FIG. 6, PLL unit 23 includes three-phase to two-phase conversion circuits 31 and 32, an induction voltage operation circuit 33, a PLL circuit 34, and a position signal generator 35.

Three-phase to two-phase conversion circuit 31 performs three-phase to two-phase conversion (d-q conversion) of voltage detection values V1, V2, V3 received from AC voltage detector 8, based on a reference phase φ.

Three-phase to two-phase conversion circuit 32 performs three-phase to two-phase conversion (d-q conversion) of current detection values I1, I2, I3 received from AC current detector 9, based on reference phase φ.

Induction voltage operation circuit 33 calculates induction voltage induced at the armature of synchronous machine 4, based on voltage values Vd and Vq converted by three-phase to two-phase conversion circuit 31 and current values Id and Iq converted by three-phase to two-phase conversion circuit 32.

A reference phase synchronized with the rotation of the rotor of synchronous machine 4 is required to perform coordinate transformation, that is, three-phase to two-phase conversion of voltage and current using three-phase to two-phase conversion circuits 31 and 32. However, in the absence of a position sensor such as a mechanical distributor, this signal cannot be obtained directly.

Then, in the synchronous machine starting device according to the first embodiment of the present invention, three-phase to two-phase conversion circuits 31 and 32 receive an initial value of reference phase φ at the time of starting of synchronous machine starting device 101 to perform coordinate transformation.

Then, induction voltage operation circuit 33 calculates induction voltage of the armature on the d-axis (in-phase component)—q-axis (quadrature component) based on the voltage values and current values on the d-q axis converted by three-phase to two-phase conversion circuits 31 and 32. The calculation of induction voltage requires a rotational speed $\omega$. However, a position sensor is not present, and therefore, frequency FI selected by switching circuit SW8 as the initial frequency corresponding to an initial value of rotational speed $\omega$ of synchronous machine 4 is applied to induction voltage operation circuit 33 at the time of starting of synchronous machine starting device 101.

When the q-axis component Zq of induction voltage calculated by induction voltage operation circuit 33, that is, the quadrature component with respect to reference phase $\phi$ is not zero, the calculation result is shifted with respect to reference phase $\phi$. This q-axis component Zq of induction voltage corresponds to an error of the estimated phase of the rotor in synchronous machine 4. Then, PLL circuit 34 is provided which performs control such that the q-axis component Zq of induction voltage is zero. PLL circuit 34 calculates rotational speed $\omega$, that is, the estimated rotational speed of the rotor of synchronous machine 4 and reference phase $\phi$, that is, the estimated phase of the rotor of synchronous machine 4 such that the q-axis component Zq of induction voltage is zero.

Figure 7:
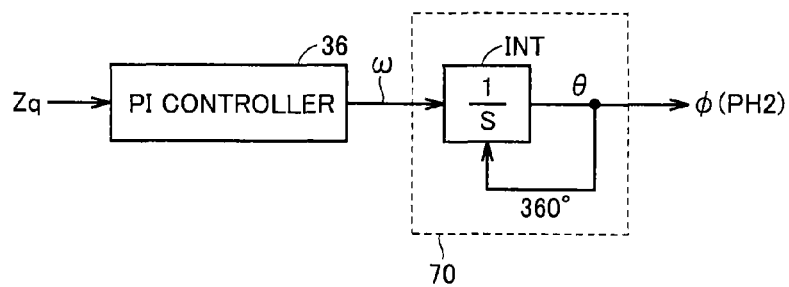
FIG. 7 is a diagram conceptually showing a configuration of a PLL circuit 34.

FIG. 7 is a diagram conceptually showing a configuration of PLL circuit 34.

Referring to FIG. 7, PLL circuit 34 includes a PI controller 36 and an integrator INT. PI controller 36 performs proportional operation and integration operation on the q-axis component Zq of induction voltage output from induction voltage operation circuit 33 in FIG. 6, and outputs a sum of the results of proportional operation and integration operation. A signal output from PI controller 36 indicates estimated rotational speed $\omega$ of the rotor of synchronous machine 4. Integrator INT integrates estimated rotational speed $\omega$ output from PI controller 36 for conversion to phase $\theta$. Integrator INT resets the value of phase $\theta$ to 0° when phase $\theta$ attains 360°. That is, phase signal PH2 output from an integrating portion 70 that includes integrator INT in FIG. 7 is an AC signal whose value changes from 0° to 360°. Phase signal PH2 indicates reference phase $\phi$ of the rotor.

Referring to FIG. 6 again, reference phase $\phi$ calculated by PLL circuit 34 is fed back to three-phase to two-phase conversion circuits 31, 32 and output to position signal generator 35. Then, position signal generator 35 outputs to selector circuit SEL position signal POS2 having a pulse-like waveform similar to that of a mechanical distributor. Three-phase to two-phase conversion circuits 31 and 32 afterward perform three-phase to two-phase conversion based on reference phase $\phi$ from PLL circuit 34.

Rotational speed $\omega$ calculated by PLL circuit 34 is applied to induction voltage operation circuit 33. Induction voltage operation circuit 33 afterward calculates induction voltage (in-phase component) Zd and induction voltage (quadrature component) Zq, based on rotational speed $\omega$ from PLL circuit 34.

In the synchronous machine starting device according to the first embodiment of the present invention, PLL circuit 34 is configured to calculate rotational speed $\omega$ and reference phase $\phi$ based on the q-axis component Zq of induction voltage only. However, the present invention is not limited thereto. PLL circuit 34 may also be configured to calculate rotational speed $\omega$ and reference phase $\phi$ based on the q-axis component Zq and the d-axis component Zd. Such a configuration enables even more accurate operation.

Referring to FIG. 2 again, selector circuit SEL selects one of detection signal ZDET, position signal POS1, and position signal POS2 and outputs to inverter control portion 19 the selected signal as rotor position signal POS indicating the rotor position of synchronous machine 4. Selection of detection signal ZDET, position signal POS1, and position signal POS2 by selector circuit SEL is controlled by control signal CTL1 output from switching control unit 27.

Switching control unit 27 mainly controls selector circuit SEL, switching circuit SW3, and switching circuit SW8 based on an amplitude of the armature voltage detected by AC voltage detector 8. Switching control unit 27 then outputs control signals CTL1, CTL2, CTL3 for controlling these circuits to selector circuit SEL, switching circuit SW3, and switching circuit SW8, respectively.

Figure 8:
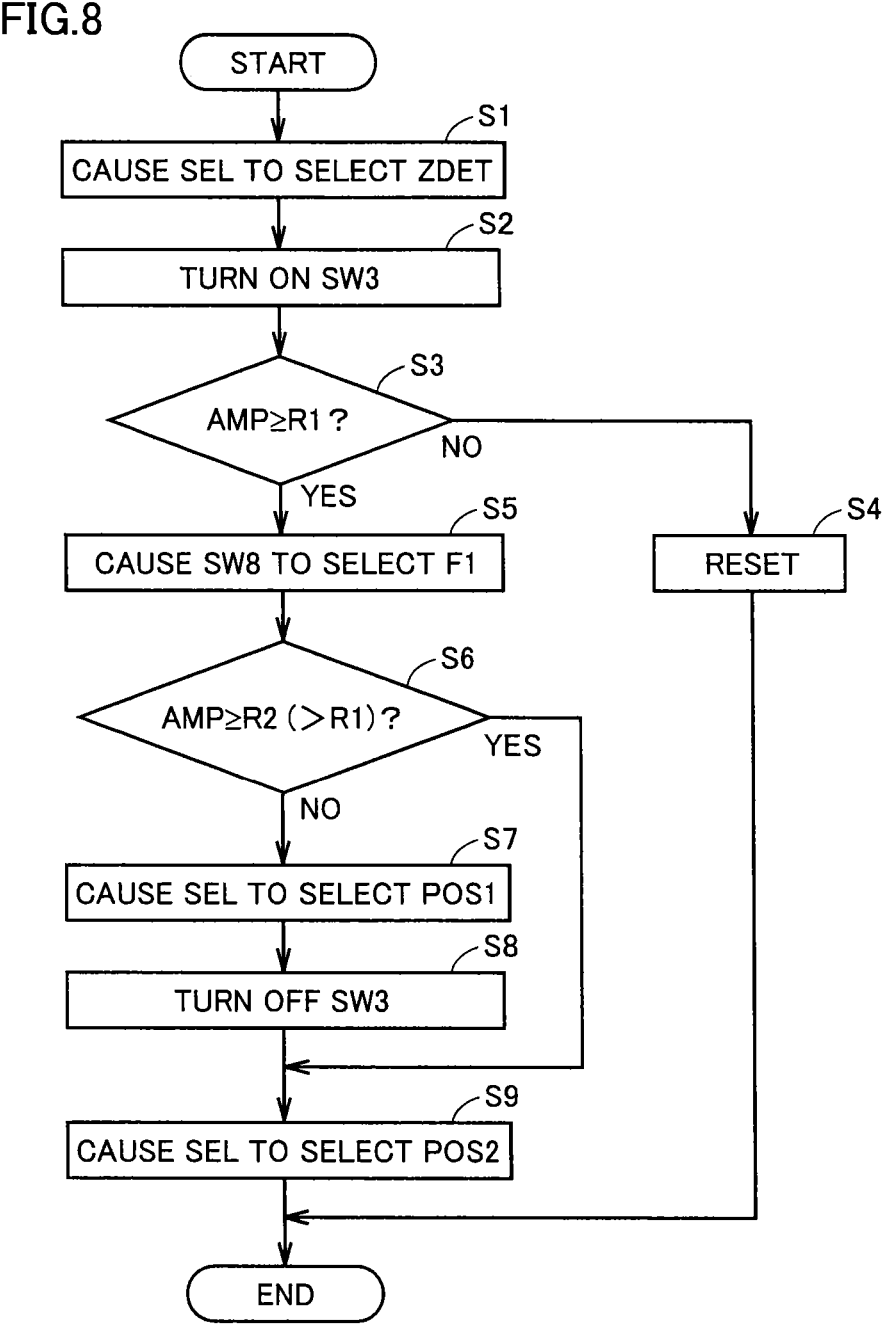
FIG. 8 is a flowchart showing a control procedure by a switching control unit 27 shown in FIG. 2.

FIG. 8 is a flowchart showing a control procedure by switching control unit 27 shown in FIG. 2.

Referring to FIGS. 2 and 8, once the synchronous machine starting device has been started to cause excitation of synchronous machine 4, an AC voltage corresponding to a current rotational speed of the rotator is generated in an armature winding of synchronous machine 4. Switching control unit 27 controls selector circuit SEL so that detection signal ZDET from zero cross detection unit 21 is output as rotor position signal POS (Step S1). Switching control unit 27 also turns switching circuit SW3 to an ON state (Step S2).

In next Step S3, switching control unit 27 determines whether or not an amplitude AMP of the armature voltage at the time of starting of the synchronous machine starting device is a prescribed reference value R1 or higher. Where amplitude AMP of the armature voltage is reference value R1 or higher (YES in Step S3), switching control unit 27 controls switching circuit SW8 so that frequency F1 detected by frequency detection unit 24 is output as initial frequency F1 (Step S5). It can be determined that amplitude AMP is reference value R1 or higher at the point in time when an absolute value of the armature voltage has reached reference value R1. By means of the above-described switching of switching circuits SW3, SW8, PLL unit 22 outputs position signal POS1 having almost the same frequency and phase as detection signal ZDET output from zero cross detection unit 21.

The control procedure after Step S5 differs depending on whether or not amplitude AMP of the armature voltage is a reference value R2 (R2 is set to be a value higher than R1). Where amplitude AMP of the armature voltage is lower than reference value R2 (NO in Step S6), switching control unit 27 causes selector circuit SEL to select position signal POS1 output from PLL unit 22 immediately before the starting of inverter 2 shown in FIG. 1, and causes the selected position signal POS1 to be output as rotor position signal POS (Step S7). Switching control unit 27 also turns switching circuit SW3 to an OFF state (Step S8). Consequently, PLL unit 22 is not influenced by zero cross detection unit 21 and enters a free-running state, thereby preventing the effect of switching noise immediately after the starting of inverter 2. Switching control unit 27 causes selector circuit SEL to select and output position signal POS2 output from PLL unit 23 as rotor position signal POS immediately after the starting of inverter 2.

On the other hand, where amplitude AMP of the armature voltage is reference value R2 or higher (YES in Step S6), switching noise immediately after the starting of inverter 2 does not become a problem, so that the above-described Steps S7 and S8 are not executed. In this case, when, for example, the number of times of zero crossing within a prescribed time has reached a prescribed number (that is, when the frequency corresponding to the current rotational speed of the rotor of the synchronous machine has exceeded a prescribed frequency), switching control unit 27 causes selector circuit SEL to select position signal POS2 output from PLL unit 23 as rotor position signal POS (Step S9).

Where amplitude AMP of the armature voltage is lower than reference value R1 in Step S3 (NO in Step S3), the synchronous machine starting device is reset (Step S4), causing the synchronous machine to be started from the initial state (turning operation). A specific procedure is shown in FIG. 9.

Figure 9:
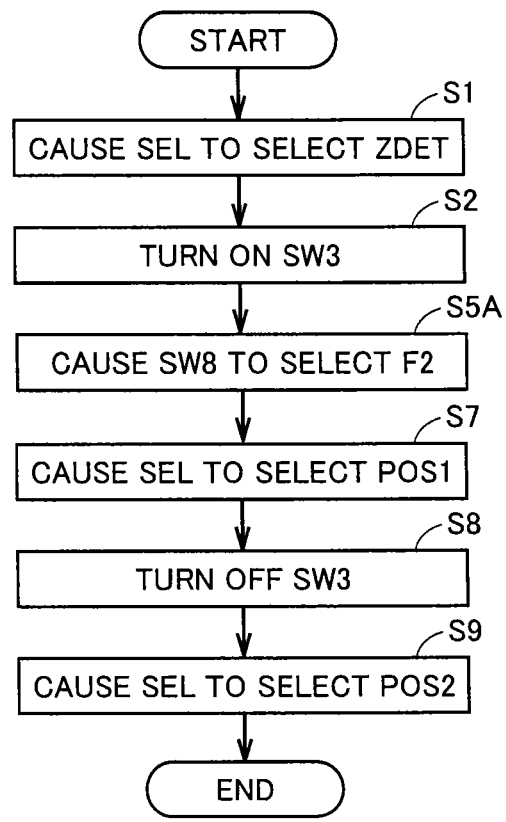
FIG. 9 is a flowchart showing a procedure in the case of starting a synchronous machine from an initial state.

FIG. 9 is a flowchart showing a procedure in the case of starting of the synchronous machine from the initial state. Where the synchronous machine is started from the initial state (turning operation), the armature voltage detected by AC voltage detector 8 shown in FIG. 2 is a considerably low value and also includes an offset. Since it is thus difficult for frequency detection unit 24 to detect frequency F1 corresponding to the rotational speed of the rotor, a prescribed frequency F2 is used as initial frequency F1.

Referring to FIGS. 2 and 9, initially, switching control unit 27 controls selector circuit SEL so that detection signal ZDET from zero cross detection unit 21 is output as rotor position signal POS (Step S1). Switching control unit 27 also turns switching circuit SW3 to the ON state (Step S2), and controls switching circuit SW8 so that prescribed frequency F2 is output as initial frequency F1 (Step S5A). In this way, PLL unit 22 outputs position signal POS1 having almost the same frequency and phase as detection signal ZDET output from zero cross detection unit 21. Then, switching control unit 27 causes selector circuit SEL to select and output position signal POS1 output from PLL unit 22 as rotor position signal POS immediately before the starting of inverter 2 shown in FIG. 2 (Step S7). Switching control unit 27 also turns switching circuit SW3 to the OFF state (Step S8). Consequently, PLL unit 22 is not influenced by zero cross detection unit 21 and enters a free-running state, thereby preventing the effect of switching noise immediately after the starting of inverter 2. Switching control unit 27 causes selector circuit SEL to select and output position signal POS2 output from PLL unit 23 as rotor position signal POS immediately after the starting of inverter 2 (Step S9).

Figure 10:
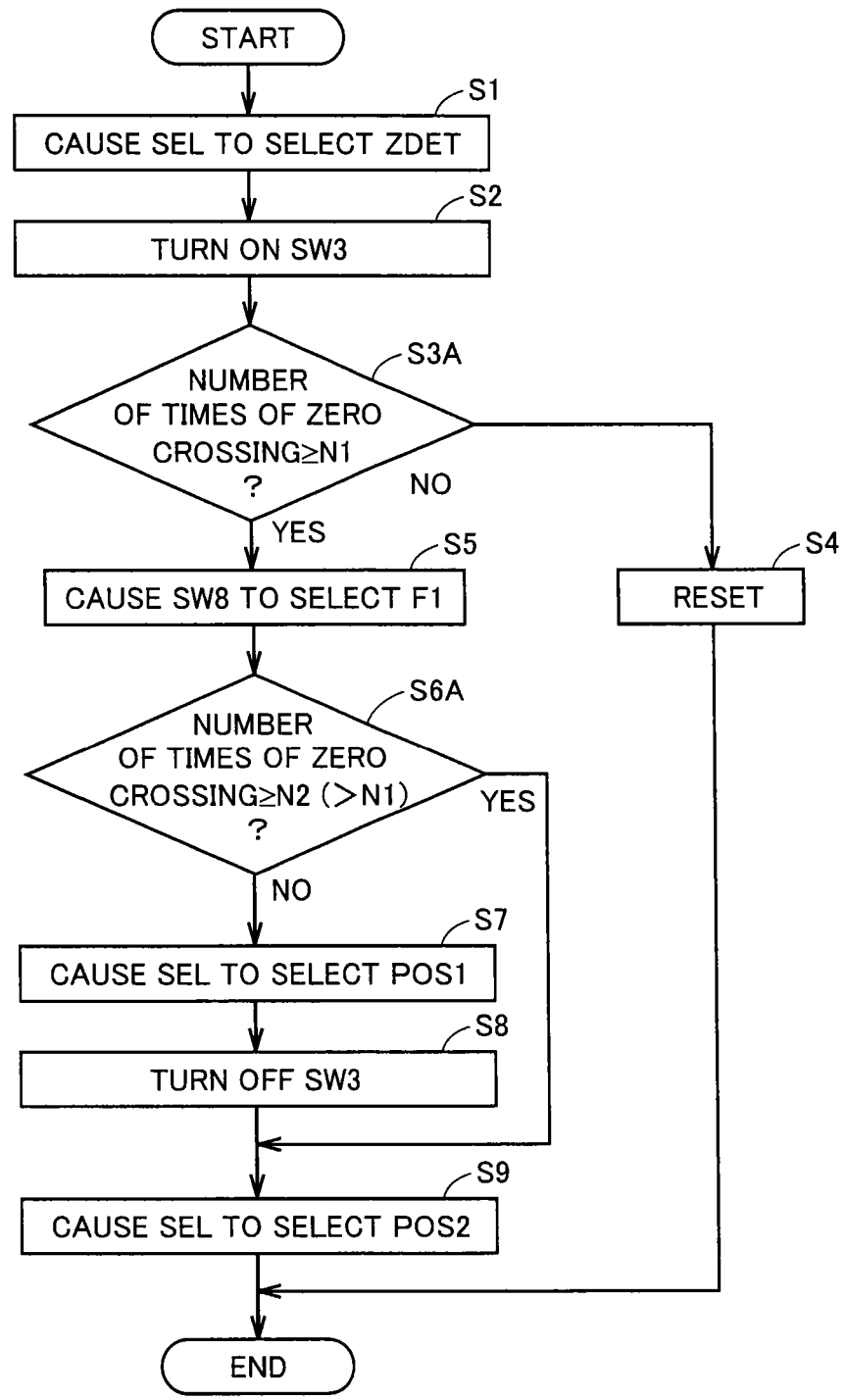
FIG. 10 is a flowchart showing a modification of the control procedure shown in FIG. 8.

FIG. 10 is a flowchart showing a modification of the control procedure shown in FIG. 8. While the control is performed based on amplitude AMP of the armature voltage in Steps S3, S6 shown in FIG. 8, control is performed based on the number of times of zero crossing within the prescribed time in Steps S3A, S6A shown in FIG. 10. In Step S3A in FIG. 10, switching control unit 27 determines whether or not the number of times of zero crossing within the prescribed time is a prescribed reference number of times N1 or greater, based on detection signal ZDET from zero cross detection unit 21. Where the number of times of zero crossing within the prescribed time is reference number of times N1 or greater, the processing proceeds to Step S5, and where the number of times of zero crossing within the prescribed time is smaller than reference number of times N1, the processing proceeds to Step S4. In Step S6A in FIG. 10, switching control unit 27 determines whether or not the number of times of zero crossing within the prescribed time is a prescribed reference number of times N2 (N2 is set to a value higher than N1) or greater. Where the number of times of zero crossing within the prescribed time is reference number of times N2 or greater, the processing proceeds to Step S9, and where the number of times of zero crossing within the prescribed time is smaller than reference number of times N1, the processing proceeds to Step S7. Since the procedure in FIG. 10 is otherwise the same as that in FIG. 8, the same or corresponding steps are denoted by the same reference sings, and a description thereof will not be repeated.

Figure 11:
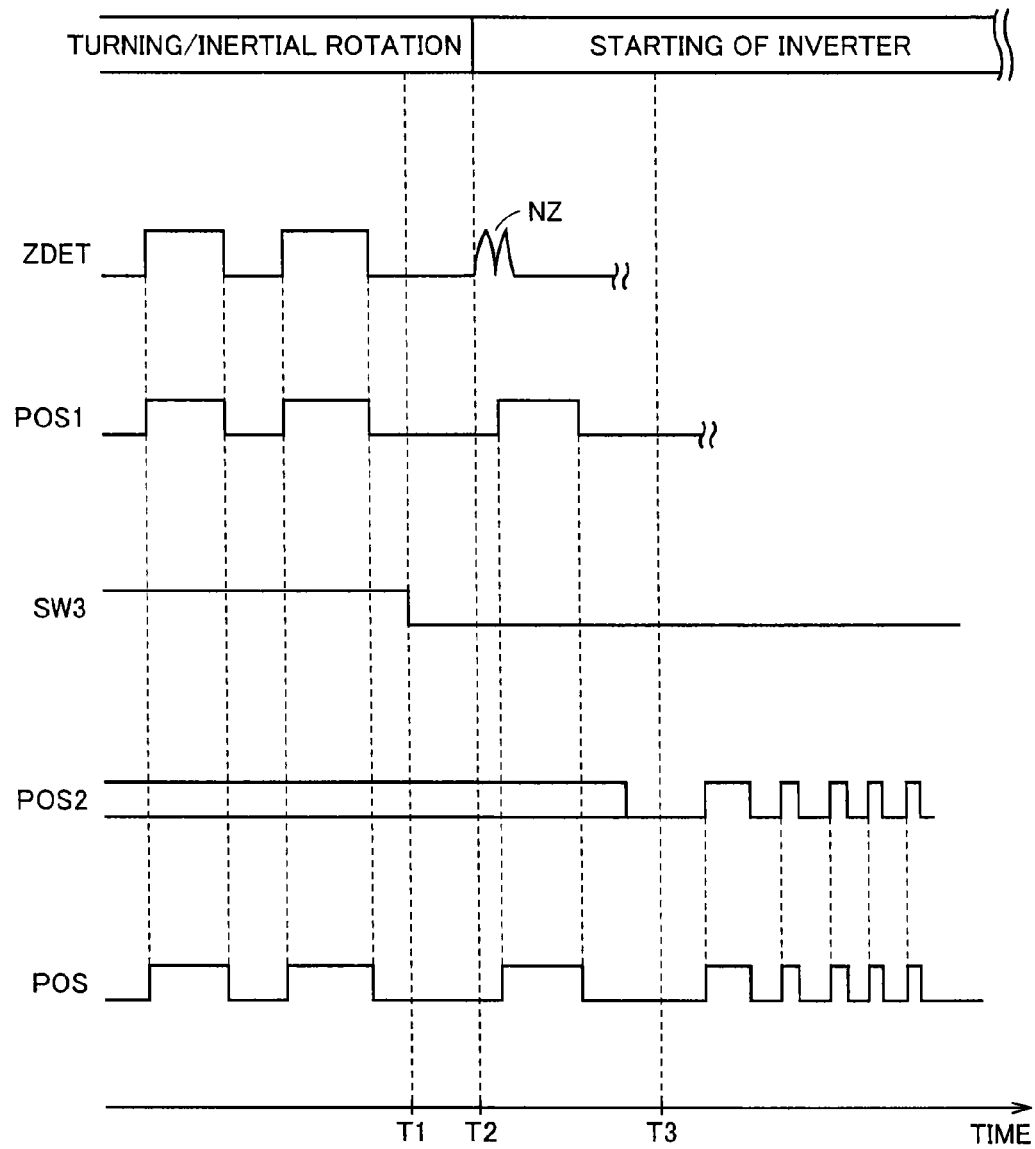
FIG. 11 is a time chart showing operation of a rotor position detection unit.

FIG. 11 is a time chart showing the operation of the rotor position detection unit.

Referring to FIGS. 2 and 11, the control procedure shown in each of FIGS. 8 and 9 will be further described below. In the following description, it is assumed that amplitude AMP of the armature voltage of synchronous machine 4 is lower than reference value R2.

Initially, before the starting of inverter 2 (that is, in turning operation during standby, or in inertial rotation immediately after the stopping of the synchronous machine), selector circuit SEL selects detection signal ZDET from zero cross detection unit 21 in accordance with control signal CTL1 (Step S1 in FIGS. 8 and 9). That is, detection signal ZDET is output as rotor position signal POS to reference sinusoidal wave operator 12.

Switching circuit SW3 in FIG. 2 is turned ON before the starting of inverter 2 (Step S2 in FIGS. 8 and 9), and frequency F1 or F2 is selected by switching circuit SW8 (Step S5 in FIG. 8 and Step S5A in FIG. 9). PLL unit 22 receives detection signal SET from zero cross detection unit 21 to be synchronized with zero cross detection unit 21 and outputs position signal POS1 having almost the same frequency and phase as detection signal ZDET from zero cross detection unit 21.

Then, at a timing T1 immediately before a timing T2 at which inverter 2 is started, selector circuit SEL selects position signal POS1 from PLL unit 22 in accordance with control signal CTL1 (Step S7 in FIGS. 8 and 9). That is, position signal POS1 is output as rotor position signal POS to reference sinusoidal wave operator 12.

At timing T1, switching circuit SW3 is turned OFF in accordance with control signal CTL2 (Step S8 in FIGS. 8 and 9), so that PLL unit 22 is not influenced by zero cross detection unit 21 and enters a free-running state.

It is noted that that the armature voltage of synchronous machine 4 is very small at the time of starting of synchronous machine 4, particularly where the rotor is rotating at an extremely low speed during turning operation. Therefore, immediately after starting of inverter 2, zero cross detection unit 21 is susceptible to switching noise from inverter 2. More specifically, zero cross detection unit 21 erroneously detects a zero cross point and outputs an erroneous detection signal ZDET as indicated by NZ in FIG. 11.

However, in the synchronous machine starting device in accordance with the first embodiment of the present invention, position signal POS1 from PLL unit 22 is selected at timing T1 and PLL unit 22 is set in a free-running state, thereby preventing the effect of switching noise from inverter 2. Before timing T1, switching circuit SW3 is turned ON to achieve synchronization between PLL unit 22 and zero cross detection unit 21, so that position signal POS1 in the free-running state can be almost matched in phase with the armature voltage of synchronous machine 4.

In place of the above-described configuration, selector circuit SEL may be configured to select position signal POS1 from PLL unit 22 at a timing T1 when the absolute value of the armature voltage of synchronous machine 4 becomes higher than the prescribed value. Accordingly, PLL unit 22 can be synchronized with zero cross detection unit 21 in a state in which the amplitude of the armature voltage of synchronous machine 4 has become sufficiently high to perform zero cross detection, after the excitation of synchronous machine 4.

Immediately after the starting, the rotational speed of synchronous machine 4 is low, and therefore, the period of the armature voltage of synchronous machine 4 may be long. Thus, selector circuit SEL may be configured to select position signal POS1 from PLL unit 22 at a timing T1 when the prescribed time has elapsed since the absolute value of the armature voltage of synchronous machine 4 becomes higher than the prescribed value. The prescribed time is set such that zero cross detection can be performed accurately. Accordingly, the armature voltage of synchronous machine 4 can be detected more accurately.

Then, at a timing T3 when a prescribed time has elapsed from timing T2 when inverter 2 is started, selector circuit SEL selects position signal POS2 from PLL unit 23 in accordance with control signal CTL1 (Step S9 in FIGS. 8 and 9). More specifically, position signal POS2 is output as rotor position signal POS to reference sinusoidal wave operator 12.

At timing T3 when the prescribed time has elapsed from timing T2 at which inverter 2 is started, the amplitude of the armature voltage of synchronous machine 4 is larger than that at the time of starting. Therefore, the effect of switching noise from inverter 2 almost disappears, so that the rotor position can be estimated more accurately using the armature voltage and armature current of synchronous machine 4, and synchronous machine 4 can be rotated stably.

In place of the above-described configuration, selector circuit SEL may be configured to select position signal POS2 from PLL unit 23 at a timing T3 when the absolute value of the armature voltage of synchronous machine 4 exceeds the prescribed value, after timing T2 at which inverter 2 is started.

Selector circuit SEL may be configured to select position signal POS2 from PLL unit 23 at a timing T3 when the prescribed time has elapsed since the absolute value of the armature voltage of synchronous machine 4 exceeds the prescribed value, after timing T2 at which inverter 2 is started.

Alternatively, selector circuit SEL may be configured to select position signal POS2 from PLL unit 23 at a timing T3 when the number of times of zero crossing within the prescribed time obtained by zero cross detection unit 21 has reached the prescribed number (that is, when the frequency corresponding to the current rotational speed of the synchronous machine has exceeded the prescribed frequency), after timing T2 at which inverter 2 is started.

Here, the function of rotor position detection unit 11 is implemented by software. For example, the function of rotor position detection unit 11 is built in, for example, a DSP (Digital Signal Processor) which performs a variety of control in synchronous machine starting device 101. This reduces the manufacturing costs.

In addition, this eliminates the time and effort of mounting a distributor at a place where synchronous machine 4 and motor M are installed.

In the synchronous machine starting device in accordance with the first embodiment of the present invention, rotor position detection unit 11 is configured to include zero cross detection unit 21, PLL unit 22, and PLL unit 23. However, the present invention is not limited thereto. Even if rotor position detection unit 11 does not include PLL unit 22, that is, it is configured to select, at the time of starting of synchronous machine 4, detection signal ZDET from zero cross detection unit 21 and position signal POS2 from PLL unit 23 in this order as rotor position signal POS, the armature voltage of synchronous machine 4 can be detected with high accuracy at the time of starting of synchronous machine 4, so that synchronous machine 4 can be started stably.

Even where rotor position detection unit 11 does not include PLL unit 22, timing T3 can be set to one of the timing when the prescribed time has elapsed from timing T2, the timing when the absolute value of the armature voltage of synchronous machine 4 exceeds the prescribed value after timing T2, and the timing when the prescribed time has elapsed since the absolute value of the armature voltage of synchronous machine 4 exceeds the prescribed value after timing T2. Timing T3 can also be set to a timing after timing T2 when the number of times of zero crossing within the prescribed time obtained by zero cross detection unit 21 has reached the prescribed number (that is, when the frequency corresponding to the current rotational speed of the synchronous machine has exceeded the prescribed frequency).

Figure 12:
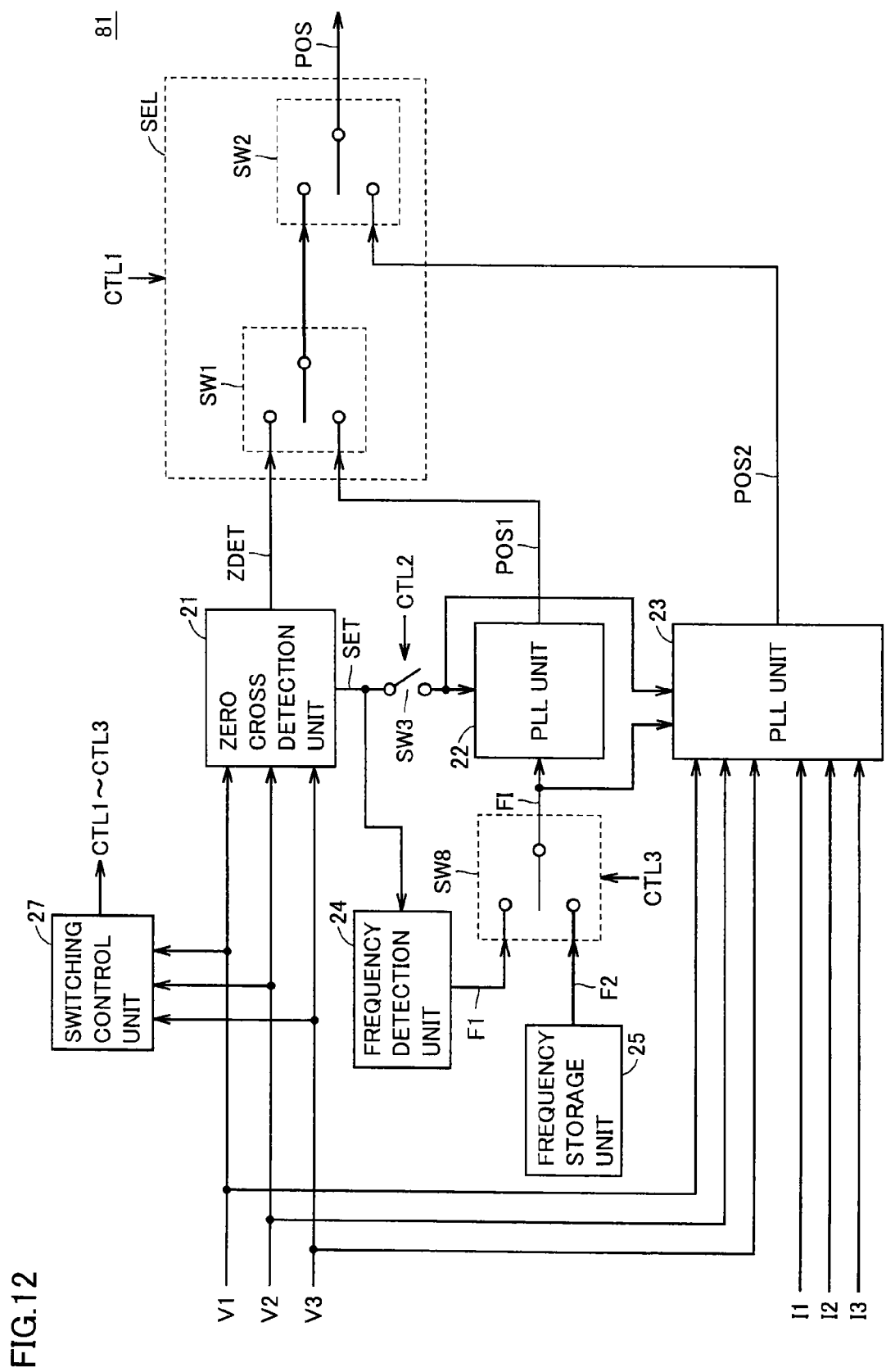
FIG. 12 is a diagram showing a configuration of a modification of rotor position detection unit 11.

FIG. 12 is a diagram showing a configuration of a modification of rotor position detection unit 11.

Referring to FIG. 12, a rotor position detection unit 81 includes a zero cross detection unit (timing detection unit) 21, a PLL unit (AC signal generation unit) 22, a PLL unit (feedback operation unit) 23, a frequency detection unit 24, a frequency storage unit 25, a switching control unit 27, a selector circuit SEL, a switching circuit SW3, and a switching circuit (initial frequency selection unit) SW8. Selector circuit SEL includes switching circuits SW1 and SW2.

As described using FIG. 8, where amplitude AMP of the armature voltage is reference value R2 or larger at the time of starting of the synchronous machine starting device (YES in Step S6 in FIG. 8), the detection voltage detected by AC voltage detector 8 is less susceptible to switching noise immediately after the starting of inverter 2. In this case, selector circuit SEL may omit position signal POS1 from PLL unit 22 and directly switch detection signal ZDET from zero cross detection unit 21 to position signal POS2 from PLL unit 23 (Step S9 in FIG. 8).

Where selector circuit SEL directly switches detection signal ZDET to position signal POS2 as in this case, position signal POS2 needs to be synchronized early with the armature voltage. Thus, switching circuit SW3 shown in FIG. 12 switches whether or not to output detection signal SET received from zero cross detection unit 21 to PLL units 22 and 23.

PLL unit 23 adjusts the phase of position signal POS2 based on detection signal SET received from switching circuit SW3.

Figure 13:
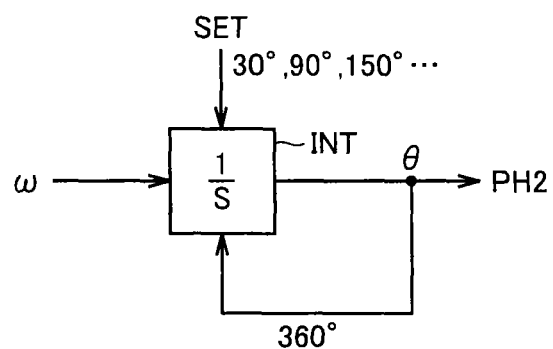
FIG. 13 is a diagram showing a configuration of an integration unit in a PLL circuit 34 in a modification of rotor position detection unit 11.

FIG. 13 is a diagram showing a configuration of an integration unit 72 in PLL circuit 34 in a modification of rotor position detection unit 11.

Referring to FIG. 13, PLL circuit 34 includes integration unit 72 in place of integration unit 70 shown in FIG. 7. Integration unit 72 has a similar configuration to that of PLL unit 22 shown in FIG. 3. More specifically, integrator INT integrates and converts rotational speed ω calculated by PI controller 36 shown in FIG. 7 into phase θ, which is then output as reference phase φ, that is, phase signal PH2. Integrator INT resets phase θ to 0° when phase θ attains 360°. Integrator INT further corrects phase θ based on an angle such as 30°, 90°, or 150° indicated by detection signal SET received from zero cross detection unit 21.

In integration unit 72, initially, phase θ starts to be increased at any given timing, and then phase θ is adjusted in response to detection signal SET to be synchronized with the armature voltage of synchronous machine 4, thus achieving phase-matching.

Referring to FIG. 12 again, selector circuit SEL selects detection signal ZDET, and thereafter selects position signal POS2 after PLL unit 23 adjusts the phase of position signal POS2 based on detection signal SET.

With the above-described configuration of integration unit 72, in rotor position detection unit 81, after detection signal ZDET is switched to position signal POS2, position signal POS2 can be synchronized early with the armature voltage of synchronous machine 4.

In the synchronous machine starting device in accordance with the first embodiment of the present invention, power conversion portion 71 is configured to include converter 1, inverter 2, and DC reactor 3. However, the present invention is not limited thereto. Power conversion portion 71 may be, for example, a matrix converter, in place of converter 1, inverter 2, and DC reactor 3, as long as it is configured to include any circuit that converts supplied power into AC power and supply the AC power to the armature of synchronous motor 4.

Another embodiment of the present invention will now be described using the drawings. It is noted that the same or corresponding parts in the figures are denoted by the same reference signs, and a description thereof will not be repeated.

Second Embodiment

The present embodiment relates to a synchronous machine starting device in which the function of adjusting the initial phase of position signal POS2 is changed as compared with the synchronous machine starting device in accordance with the first embodiment. The description other than that given below is similar to that of the synchronous machine starting device in accordance with the first embodiment of the present invention.

Figure 14:
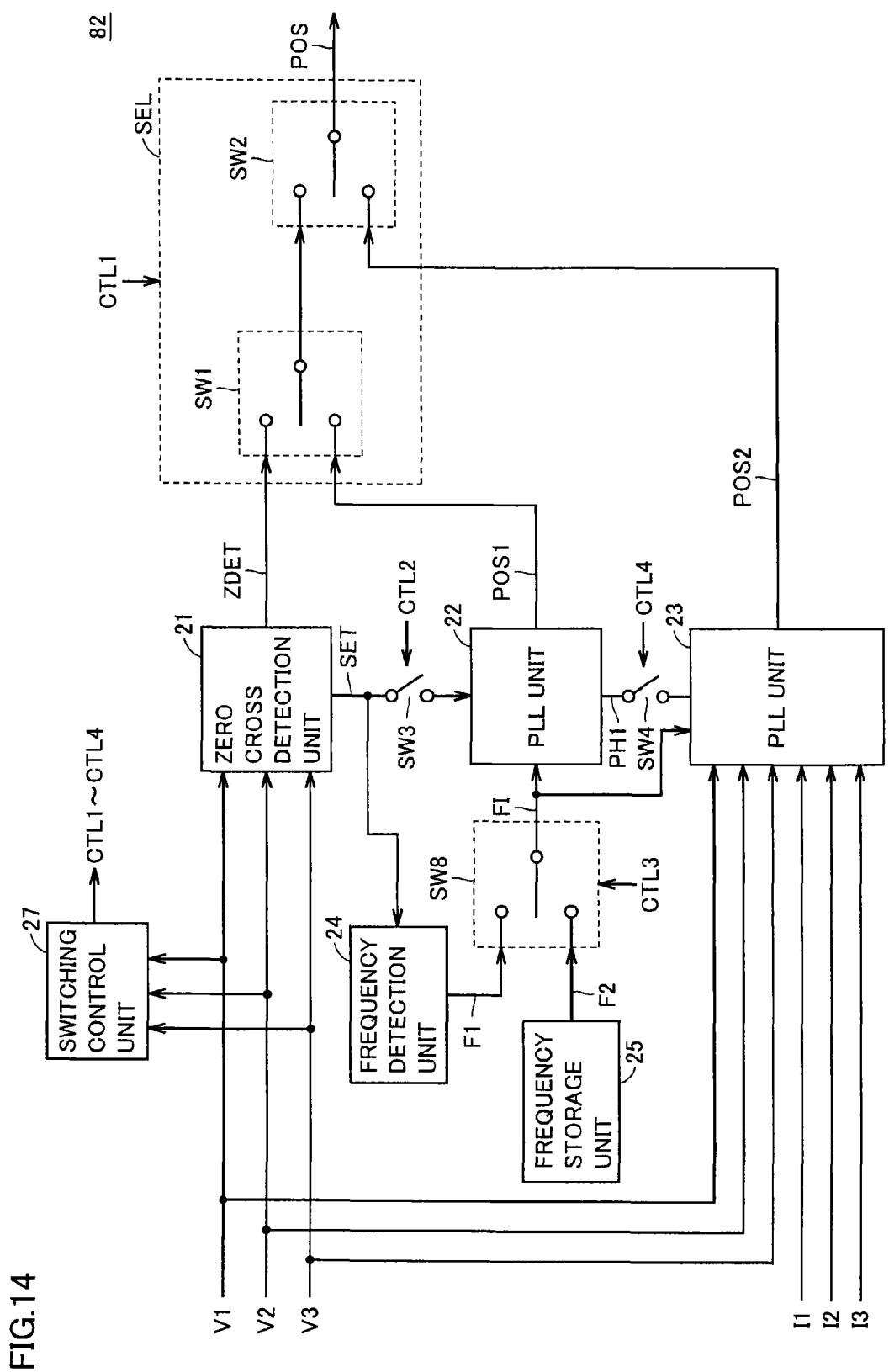
FIG. 14 is a diagram showing a configuration of a rotor position detection unit in accordance with a second embodiment of the present invention.

FIG. 14 is a diagram showing a configuration of a rotor position detection unit in accordance with the second embodiment of the invention.

Referring to FIG. 14, a rotor position detection unit 82 differs from rotor position detection unit 11 in accordance with the first embodiment of the invention in that it further includes a switching circuit SW4.

Switching circuit SW4 switches whether or not to output phase signal PH1 received from PLL unit 22 to PLL unit 23.

PLL unit 23 adjusts the phase of position signal POS2 based on phase signal PH1 received from switching circuit SW4.

For example, selector circuit SEL selects position signal POS1 in accordance with control signal CTL1, and thereafter selects position signal POS2 after PLL unit 23 adjusts the phase of position signal POS2 based on phase signal PH1.

Figure 15:
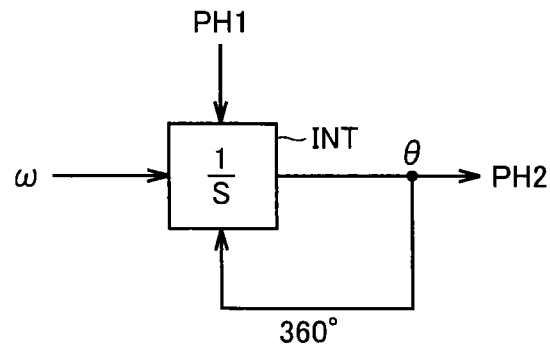
FIG. 15 is a diagram showing a configuration of an integration unit in PLL circuit 34 in accordance with the second embodiment of the present invention.

FIG. 15 is a diagram showing a configuration of an integration unit in PLL circuit 34 in accordance with the second embodiment of the invention.

Referring to FIG. 15, PLL circuit 34 includes an integration unit 73 in place of integration unit 70 shown in FIG. 70. Integration unit 73 has a similar configuration to that of PLL unit 22 shown in FIG. 3. More specifically, integrator INT integrates and converts rotational speed ω calculated by PI controller 36 shown in FIG. 7 into phase θ, which is then output as reference phase φ, that is, phase signal PH2. Integrator INT resets phase θ to 0° when phase θ attains 360°. Integrator INT also corrects phase θ based on the angle indicated by phase signal PH1 received from PLL unit 22.

In integration unit 73, initially, phase θ starts to be increased at any given timing, and then phase θ is adjusted in response to phase signal PH1 to be synchronized with the armature voltage of synchronous machine 4. Thus, phase-matching is achieved.

Now, phase signal PH2 is generated based on voltage detection values V1, V2, V3 received from AC voltage detector 8 and current detection values I1, I2, I3 received from AC current detector 9. At timing T3 when a prescribed time has elapsed since timing T2 at which inverter 2 is started, the selection by selector circuit SEL is switched from position signal POS1 to position signal POS2. This timing T3 is in a transition period before the amplitude of the armature voltage of synchronous machine 4 becomes large enough. Therefore, if integration unit 73 is operated at a given timing, it may take time for position signal POS2 to be synchronized with the armature voltage of synchronous machine 4.

However, in the synchronous machine starting device in accordance with the second embodiment of the present invention, the initial value of phase signal PH2 is matched with phase signal PH1, so that the estimation of the rotor position of synchronous machine 4 by PLL unit 23 can be started from the phase that is almost matched with the armature voltage of synchronous machine 4. That is, after position signal POS1 is switched to position signal POS2, position signal POS2 can be synchronized early with the armature voltage of synchronous machine 4.

Figure 16:
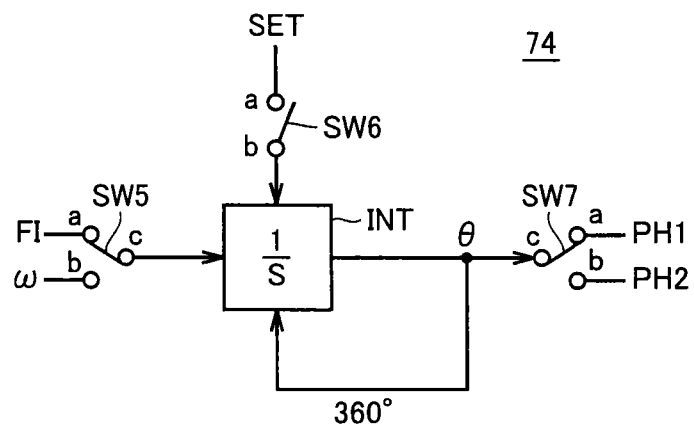
FIG. 16 is a diagram showing a configuration of a modification of the integration unit in the synchronous machine starting device in accordance with the second embodiment of the present invention.

FIG. 16 is a diagram showing a configuration of a modification of the integration unit in the synchronous machine starting device in accordance with the second embodiment of the invention.

Referring to FIG. 16, an integration unit 74 includes integrator INT and switching circuits SW5, SW6, SW7. Integration unit 74 is shared by PLL units 22 and 23.

More specifically, switching circuit SW5 switches whether to apply frequency F1 selected by switching circuit SW8 shown in FIG. 14 to integrator INT or apply rotational speed ω calculated by PI controller 36 shown in FIG. 7 to integrator INT.

Switching circuit SW6 switches whether or not to apply detection signal SET received from zero cross detection unit 21 to integrator INT.

Switching circuit SW7 switches whether to output phase θ from integrator INT as phase signal PH1 to the position signal generator or to output as phase signal PH2 to the position signal generator.

Integration unit 74 has a similar configuration to that of PLL unit 22 shown in FIG. 3. More specifically, integrator NT integrates and converts frequency F1 or rotational speed ω applied from switching circuit SW5 into phase θ for output. Integrator INT resets phase θ to 0° when phase θ attains 360°. Integrator INT further corrects phase θ based on an angle such as 30°, 90°, or 150° indicated by detection signal SET received from zero cross detection unit 21.

In integration unit 74, initially, phase θ starts to be increased at any given timing, and then phase θ is adjusted in response to detection signal SET to be synchronized with the armature voltage of synchronous machine 4. Thus, phase-matching is achieved.

The operation of integration unit 74 will now be described.

Initially, when selector circuit SEL selects position signal POS1 from PLL unit 22 in accordance with control signal CTL1, switching circuits SW5, SW6, SW7 are switched to the terminal a side. More specifically, switching circuit SW5 applies frequency F1 to integrator INT, switching circuit SW6 applies detection signal SET received from zero cross detection portion 21 to integrator INT, and switching circuit SW7 outputs phase θ from integrator INT as phase signal PH1 to the position signal generator.

Then, when selector circuit SEL selects position signal POS2 from PLL unit 23 in accordance with control signal CTL1, simultaneously, switching circuits SW5, SW7 are switched to the terminal b side, and switching circuit SW6 is opened. More specifically, switching circuit SW5 applies rotational speed ω calculated by P1 controller 36 to integrator INT, switching circuit SW6 does not apply detection signal SET received from zero cross detection unit 21 to integrator INT, and switching circuit SW7 outputs phase θ from integrator INT as phase signal PH2 to the position signal generator.

In this manner, integration portion 74 can be used to share the integration unit between PLL units 22 and 23, thereby achieving size reduction. As compared with rotor position detection unit 82 shown in FIG. 14, the passing of phase signal PH1 between PLL units 22 and 23 is unnecessary. That is, integrator INT can perform the integration operation, taking over the integration result as obtained immediately before timing T3 at which the selection by selector circuit SEL is switched from position signal POS1 to position signal POS2. This can simplify the circuit configuration.

Other configuration and operation are similar to the synchronous machine starting device in accordance with the first embodiment, and therefore, a detailed description thereof will not be repeated here.

Another embodiment of the present invention will now be described using the drawings. It is noted that in the figures the same or corresponding parts are denoted by the same reference signs, and a description thereof will not be repeated.

Third Embodiment

The present embodiment relates to a synchronous machine starting device that differs from the synchronous machine starting device in accordance with the first embodiment in that detection signal ZDET is not selected as rotor position signal POS. The description other than that given below is similar to that of the synchronous machine starting device in accordance with the first embodiment of the present invention.

Figure 17:
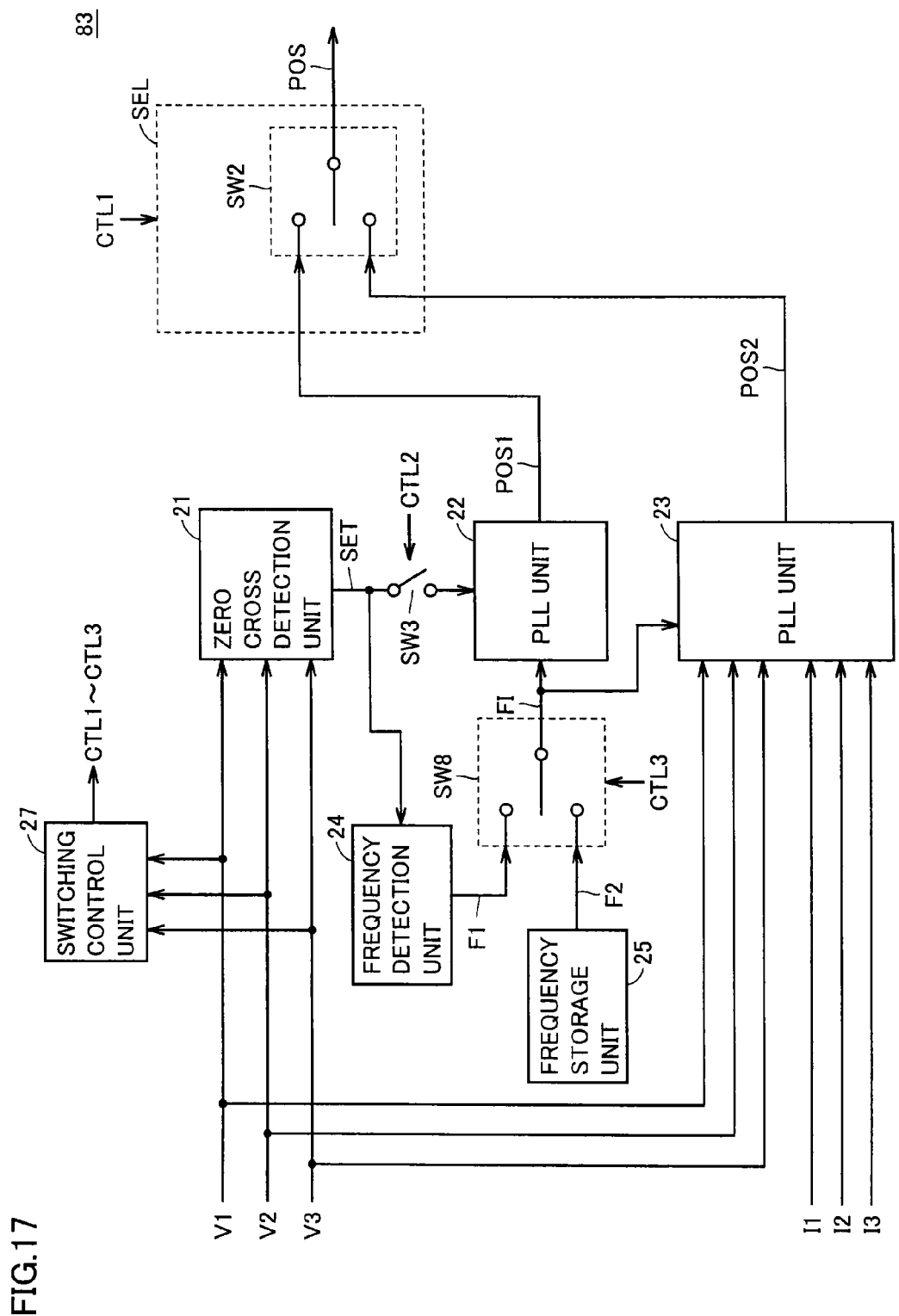
FIG. 17 is a diagram showing a configuration of a rotor position detection unit in accordance with a third embodiment of the present invention.

FIG. 17 is a diagram showing a configuration of a rotor position detection unit in accordance with the third embodiment of the invention.

Referring to FIG. 17, a rotor position detection unit 83 differs from rotor position detection unit 11 in accordance with the first embodiment of the invention in that selector circuit SEL does not include switching circuit SW1.

Selector circuit SEL selects one of position signal POS1 and position signal POS2 and outputs the selected signal as rotor position signal POS that indicates the rotor position of synchronous machine 4 to inverter control unit 19.

Figure 18:
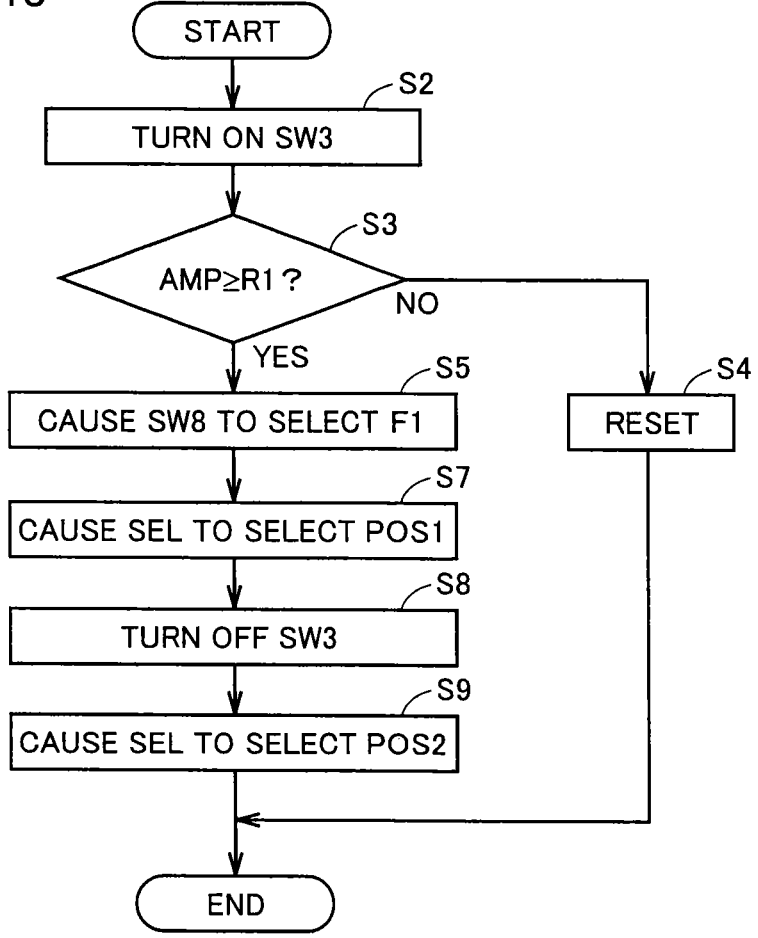
FIG. 18 is a flowchart showing a control procedure by switching control unit 27 shown in FIG. 17.

FIG. 18 is a flowchart showing a control procedure by switching control unit 27 shown in FIG. 17.

Referring to FIGS. 17 and 18, once the synchronous machine starting device has been started to cause excitation of synchronous machine 4, a voltage corresponding to the current rotational speed of the rotator is generated in the armature winding of synchronous machine 4. Switching control unit 27 also turns switching circuit SW3 to the ON state (Step S2).

In next Step S3, switching control unit 27 determines whether or not amplitude AMP of the armature voltage at the time of starting of the synchronous machine starting device is a prescribed reference value R1 or higher. Where amplitude AMP of the armature voltage is reference value R1 or higher (YES in Step S3), switching control unit 27 controls switching circuit SW8 so that frequency F1 detected by frequency detection unit 24 is output as initial frequency F1 (Step S5). By means of the switching between switching circuits SW3, SW8 described above, PLL unit 22 outputs position signal POS1 having almost the same frequency and phase as detection signal ZDET output from zero cross detection unit 21.

Then, switching control unit 27 causes selector circuit SEL to output position signal POS1 output from PLL unit 22 as rotor position signal POS immediately before the starting of inverter 2 shown in FIG. 1 (Step S7). Switching control unit 27 also turns switching circuit SW3 to the OFF state (Step S8). Consequently, PLL unit 22 is not influenced by zero cross detection unit 21 and enters a free-running state. Switching control unit 27 causes selector circuit SEL to output position signal POS2 output from PLL unit 23 as rotor position signal POS immediately after the starting of inverter 2 (Step S9).

On the other hand, in the case of NO in Step S3 (that is, where amplitude AMP of the armature voltage is lower than reference value R1), the synchronous machine starting device is reset (Step S4), causing the synchronous machine to be started from the initial state (turning operation). A specific procedure is shown in FIG. 19.

Figure 19:
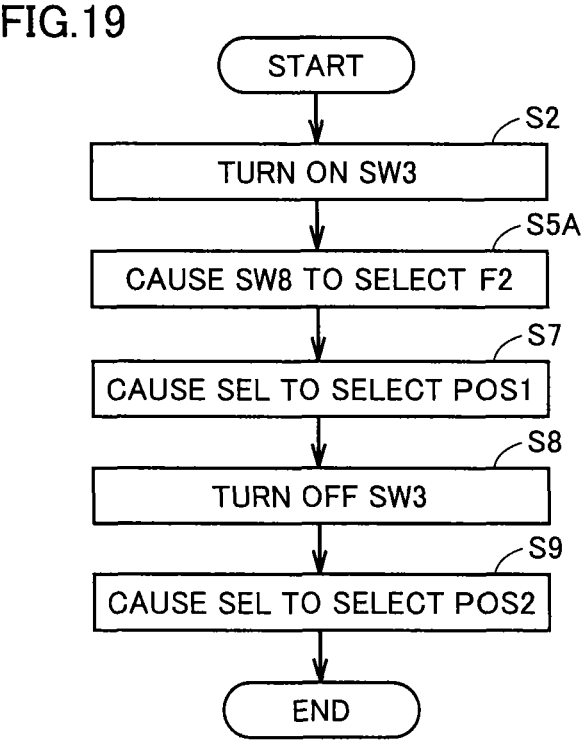
FIG. 19 is a flowchart showing a procedure in the case of starting of the synchronous machine from the initial state.

FIG. 19 is a flowchart showing a procedure in the case of starting of the synchronous machine from the initial state.

Referring to FIGS. 17 and 19, switching control unit 27 initially turns switching circuit SW3 to the ON state (Step S2), and controls switching circuit SW8 so that prescribed frequency F2 is output as initial frequency F1 (Step S5A). In this way, PLL unit 22 outputs position signal POS1 having almost the same frequency and phase as detection signal ZDET output from zero cross detection unit 21. Then, switching control unit 27 causes selector circuit SEL to select and output position signal POS1 output from PLL unit 22 as rotor position signal POS immediately before the starting of inverter 2 shown in FIG. 1 (Step S7). Switching control unit 27 also turns switching circuit SW3 to the OFF state (Step S8). Consequently, PLL unit 22 is not influenced by zero cross detection unit 21 and enters a free-running state, thereby preventing the effect of switching noise immediately after the starting of inverter 2. Switching control unit 27 causes selector circuit SEL to select and output position signal POS2 output from PLL unit 23 as rotor position signal POS immediately after the starting of inverter 2 (Step S9).

Figure 20:
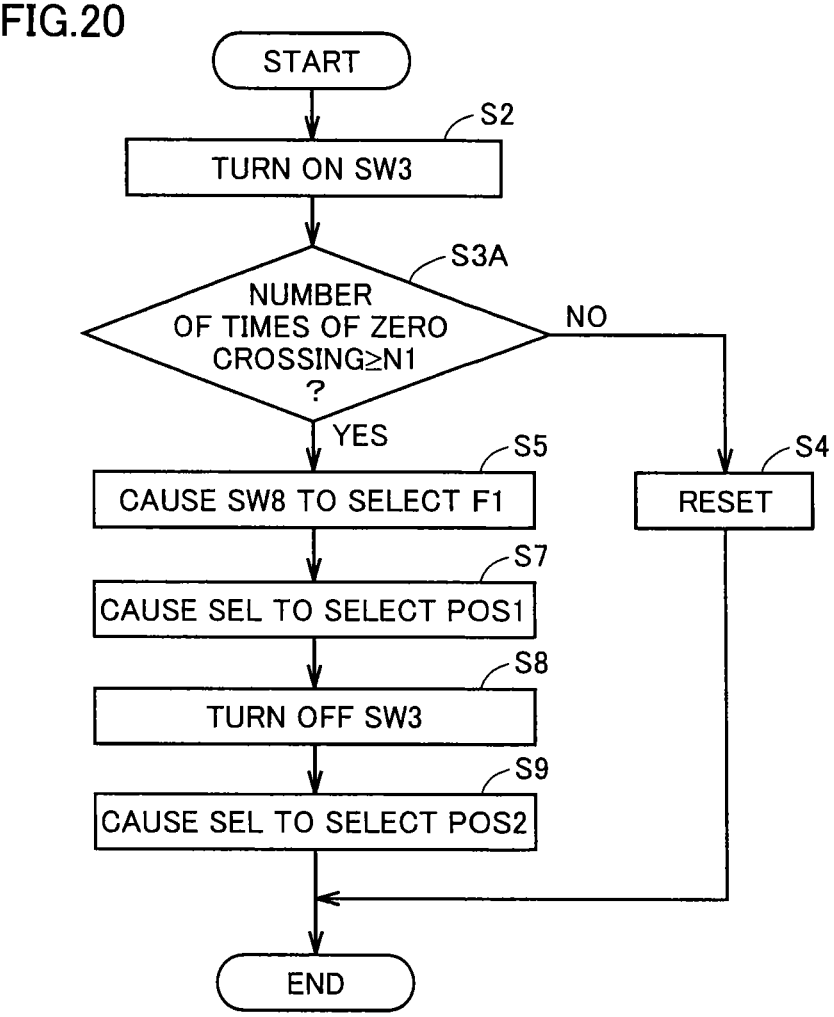
FIG. 20 is a flowchart showing a modification of the control procedure shown in FIG. 18.

FIG. 20 is a flowchart showing a modification of the control procedure shown in FIG. 18. While the control is performed based on amplitude AMP of the armature voltage in Step S3 shown in FIG. 18, control is performed based on the number of times of zero crossing within the prescribed time in Step S3A shown in FIG. 20. In Step S3A in FIG. 20, switching control unit 27 determines whether or not the number of times of zero crossing within the prescribed time is a prescribed reference number of times N1 or greater, based on detection signal ZDET from zero cross detection unit 21. Where the number of times of zero crossing within the prescribed time is reference number of times N1 or greater, the processing proceeds to Step S5, and where the number of times of zero crossing within the prescribed time is smaller than reference number of times N1, the processing proceeds to Step S4. Since the procedure in FIG. 20 is otherwise the same as that in FIG. 18, the same or corresponding steps are denoted by the same reference numerals, and a description thereof will not be repeated.

Referring to FIG. 11 again, the control procedure shown in each of FIGS. 18 and 19 will be further described.

Before the starting of inverter 2 (that is, in turning operation during standby, or in inertial rotation immediately after the stopping of the synchronous machine), selector circuit SEL initially selects position signal POS1 from PLL unit 22 in accordance with control signal CTL1 (Step S7 in FIGS. 18 and 19). That is, position signal POS1 is output as rotor position signal POS to reference sinusoidal wave operator 12.

Switching circuit SW3 is turned ON before the starting of inverter 2 (Step S2 in FIGS. 18 and 19), and frequency F1 or F2 is selected by switching circuit SW8 (Step S5 in FIG. 18 and Step 5A in FIG. 19). PLL unit 22 receives detection signal SET from zero cross detection unit 21 to be synchronized with zero cross detection unit 21 and outputs position signal POS1 having almost the same frequency and phase as detection signal ZDET from zero cross detection unit 21.

Then, at timing T1 immediately before timing T2 at which inverter 2 is started, switching circuit SW3 is turned OFF in accordance with control signal CTL2 (Step S8 in FIGS. 18 and 19). Therefore, PLL unit 22 is not influenced by zero cross detection unit 21 and enters a free-running state.

It is noted that that the armature voltage of synchronous machine 4 is very small at the time of starting of synchronous machine 4, particularly where the rotor is rotating at an extremely low speed during turning operation. Therefore, immediately after starting of inverter 2, zero cross detection unit 21 is susceptible to switching noise from inverter 2. More specifically, zero cross detection unit 21 erroneously detects a zero cross point and generates an erroneous detection signal ZDET as shown by NZ in FIG. 11, thereby to output an erroneous detection signal SET.

However, the synchronous machine starting device in accordance with the third embodiment of the invention is configured to bring PLL unit 22 into a free-running state at timing T1, thereby preventing the effect of switching noise from inverter 2. Before timing T1, switching circuit SW3 is turned ON to achieve synchronization between PLL unit 22 and zero cross detection unit 21, so that position signal POS1 in the free-running state can be almost matched in phase with the armature voltage of synchronous machine 4.

In place of the above-described configuration, rotor position detection unit 83 may be configured to bring PLL unit 22 into a free-running state at timing T1 when the absolute value of the armature voltage of synchronous machine 4 becomes higher than the prescribed value. Accordingly, PLL unit 22 can be synchronized with zero cross detection unit 21 in a state in which the amplitude of the armature voltage of synchronous machine 4 has become sufficiently high to perform zero cross detection, after the excitation of synchronous machine 4.

Immediately after the starting, the rotational speed of synchronous machine 4 is low, and therefore, the period of the armature voltage of synchronous machine 4 may be long. Thus, rotor position detection unit 83 may be configured to bring PLL unit 22 into a free-running state at timing T1 when the prescribed time has elapsed since the absolute value of the armature voltage of synchronous machine 4 becomes higher than the prescribed value. The prescribed time is set such that zero cross detection can be performed accurately. Accordingly, the armature voltage of synchronous machine 4 can be detected more accurately.

Then, at a timing T3 after a prescribed time has elapsed from timing T2 when inverter 2 is started, selector circuit SEL selects position signal POS2 from PLL unit 23 in accordance with control signal CTL1 (Step S9 in FIGS. 18 and 19). More specifically, position signal POS2 is output as rotor position signal POS to reference sinusoidal wave operator 12.

At timing T3 when the prescribed time has elapsed from timing T2 at which inverter 2 is started, the amplitude of the armature voltage of synchronous machine 4 is larger than that at the time of starting. Therefore, the effect of switching noise from inverter 2 almost disappears, so that the rotor position can be estimated more accurately using the armature voltage and armature current of synchronous machine 4, and synchronous machine 4 can be rotated stably.

In place of the above-described configuration, selector circuit SEL may be configured to select position signal POS2 from PLL unit 23 at timing T3 when the absolute value of the armature voltage of synchronous machine 4 exceeds the prescribed value, after timing T2 at which inverter 2 is started.

Selector circuit SEL may be configured to select position signal POS2 from PLL unit 23 at timing T3 when the prescribed time has elapsed since the absolute value of the armature voltage of synchronous machine 4 exceeds the prescribed value, after timing T2 at which inverter 2 is started.

Alternatively, selector circuit SEL may be configured to select position signal POS2 from PLL unit 23 at timing T3 when the number of times of zero crossing within the prescribed time obtained by zero cross detection unit 21 has reached the prescribed number (that is, when the frequency corresponding to the current rotational speed of the synchronous machine has exceeded the prescribed frequency), after timing T2 at which inverter 2 is started.

In the synchronous machine starting device in accordance with the third embodiment of the invention, PLL unit 22 adjusts the phase of position signal POS1 based on detection signal SET received from zero cross detection unit 21. Accordingly, even if detection signal ZDET from zero cross detection unit 21 is not selected as rotor position signal POS, the rotor position of synchronous machine 4 can be detected well by selecting position signal POS1 as rotor position signal POS. In this configuration, selector circuit SEL does not include switching circuit SW1, so that size reduction of the synchronous machine starting device can be achieved.

Other configuration and operation are similar to the synchronous machine starting device in accordance with the first embodiment, and therefore, a detailed description thereof will not be repeated here.

Another embodiment of the present invention will now be described using the drawings. It is noted that in the figures the same or corresponding parts are denoted by the same reference signs, and a description thereof will not be repeated.

Fourth Embodiment

The present embodiment relates to a synchronous machine starting device in which the function of adjusting the initial phase of position signal POS2 is changed as compared with the synchronous machine starting device in accordance with the third embodiment. The description other than that given below is similar to that of the synchronous machine starting device in accordance with the third embodiment of the present invention.

Figure 21:
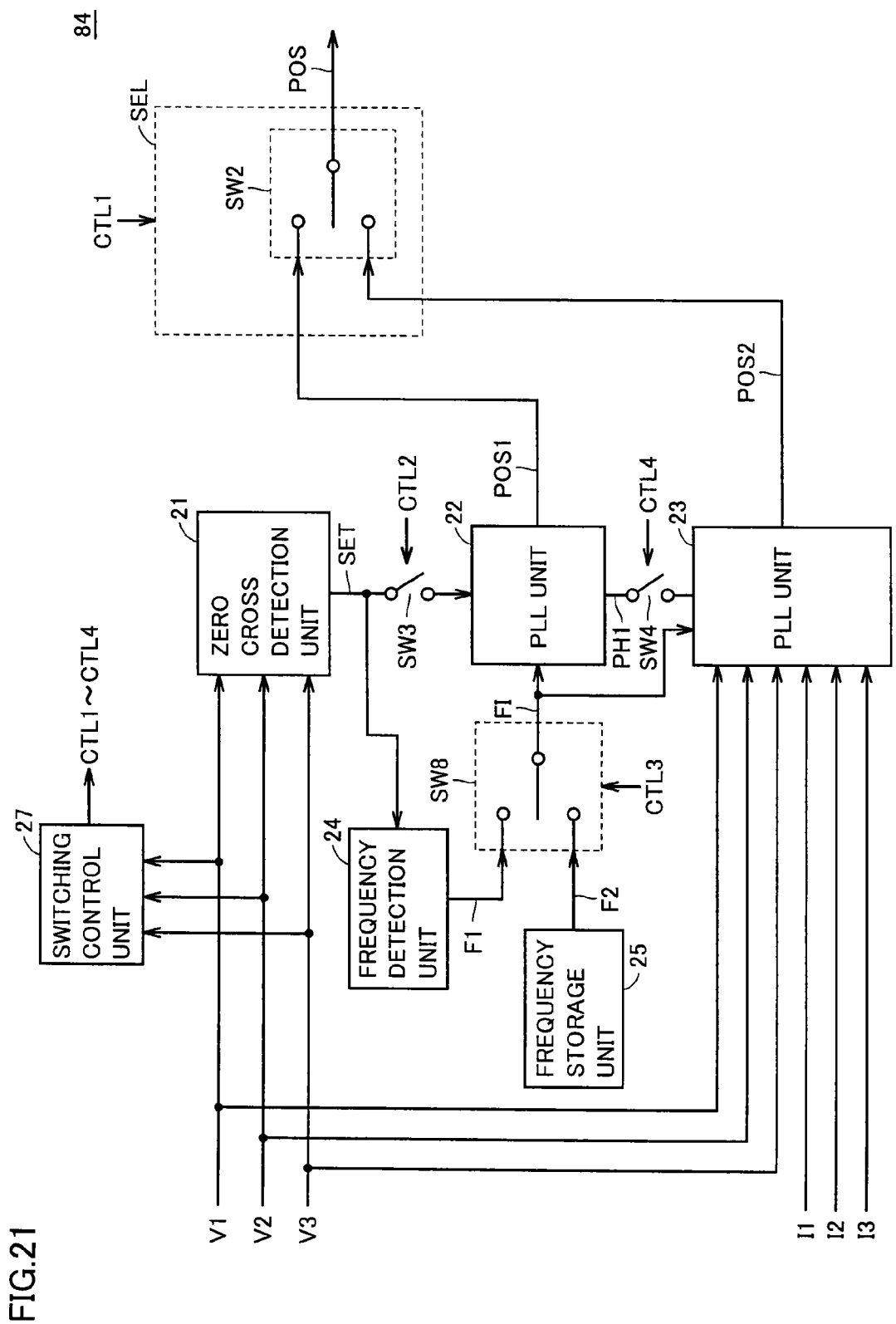
FIG. 21 is a diagram showing a configuration of a rotor position detection unit in accordance with a fourth embodiment of the present invention.

FIG. 21 is a diagram showing a configuration of a rotor position detection unit in accordance with the fourth embodiment of the invention.

Referring to FIG. 21, a rotor position detection unit 84 differs from rotor position detection unit 83 in accordance with the third embodiment of the invention in that it further includes switching circuit SW4.

Switching circuit SW4 switches whether or not to output phase signal PH1 received from PLL unit 22 to PLL unit 23.

PLL unit 23 adjusts the phase of position signal POS2 based on phase signal PH1 received from switching circuit SW4.

For example, selector circuit SEL selects position signal POS1 in accordance with control signal CTL1, and thereafter selects position signal POS2 after PLL unit 23 adjusts the phase of position signal POS2 based on phase signal PH1.

The configuration and operation of integration units 73 and 74 in PLL circuit 34 of rotor position detection unit 84 is similar to the second embodiment of the invention, and therefore, a detailed description thereof will not be repeated.

Other configuration and operation are similar to the synchronous machine starting device in accordance with the third embodiment, and therefore, a detailed description thereof will not be repeated here.

The embodiments disclosed here should be understood as being illustrative rather than being limitative in all respects. The scope of the present invention is shown not in the above-described description but in the claims, and it is intended that all modifications that come within the meaning and range of equivalence to the claims are embraced here.

REFERENCE SIGNS LIST

1 converter, 2 inverter, 3 DC reactor, 8 AC voltage detector, 9 AC current detector, 11, 81, 82, 83, 84 rotor position detection unit, 12 reference sinusoidal wave operator, 13 gate pulse generator, 14 β command circuit, 19 inverter control unit (power conversion control unit), 21 zero cross detection unit (timing detection unit), 22 PLL unit (AC signal generation unit), 23 PLL unit (feedback operation unit), 24 frequency detection unit, 25 frequency storage unit, 27 switching control unit, 31, 32 three-phase to two-phase conversion circuit, 33 induction voltage operation circuit, 34 PLL circuit, 71 power conversion unit, 101 synchronous machine starting device, SEL selector circuit, SW1-SW7 switching circuit, SW8 switching circuit (initial frequency selection unit), INT integrator, 35 PGEN position signal generator.

The invention claimed is:

1. A synchronous machine starting device comprising:
   a power conversion unit for converting supplied power into AC power and supplying the AC power to an armature of a synchronous machine;
   an AC voltage detection unit for detecting AC voltage supplied to or generated at the armature of said synchronous machine;
   an AC current detection unit for detecting AC current supplied to or generated at the armature of said synchronous machine;
   a rotor position detection unit for detecting a rotor position of said synchronous machine, based on said detected AC voltage and AC current; and
   a power conversion control portion for controlling said power conversion unit, based on said detected rotor position,
   said rotor position detection unit including:
   a timing detection unit for outputting a first position signal indicating a timing at which a value of said detected AC voltage passes a prescribed reference level;
   a feedback operation unit for calculating an error of an estimated phase based on said estimated phase indicating said rotor position, an estimated rotational speed of the rotor of said synchronous machine, as well as said detected AC voltage and AC current, updating said estimated phase and said estimated rotational speed based on said calculated phase error, and outputting a second position signal indicating said updated estimated phase;
   a frequency detection unit for detecting a first frequency corresponding to a rotational speed of the rotor of said synchronous machine at the time of starting of said synchronous machine starting device based on said first position signal, for use as an initial frequency corresponding to an initial value of said estimated rotational speed; and
   a selector circuit for selecting said first position signal or a position signal obtained based on said first position signal, outputting the selected signal to said power conversion control portion as a signal indicating the rotor position of said synchronous machine, releasing selection of said first position signal or the position signal obtained based on said first position signal, and thereafter selecting said second position signal for output to said power conversion control portion as a signal indicating the rotor position of said synchronous machine.

2. The synchronous machine starting device according to claim 1, wherein
   said rotor position detection unit further includes:
   an initial frequency selection unit for selecting either one of said first frequency and a prescribed second frequency as said initial frequency;
   said second frequency is a frequency corresponding to a prescribed rotational speed of said rotor during standby of said synchronous machine;
   said initial frequency selection unit selects said first frequency where an absolute value of said detected AC voltage is a prescribed value or higher at the time of starting of said synchronous machine starting device; and
   said initial frequency selection unit selects said second frequency where the absolute value of said detected AC voltage does not reach said prescribed value within a prescribed time at the time of starting of said synchronous machine starting device.

3. The synchronous machine starting device according to claim 1, wherein
   said rotor position detection unit further includes an initial frequency selection unit for selecting either one of said first frequency and a prescribed second frequency as said initial frequency,
   said second frequency is a frequency corresponding to a predetermined rotational speed of said rotor during standby of said synchronous machine,
   said initial frequency selection unit selects said first frequency where the number of times that the value of said detected AC voltage passes said reference level within a prescribed time is a prescribed number or greater at the time of starting of said synchronous machine starting device, and
   said initial frequency selection unit selects said second frequency where the number of times that the value of said detected AC voltage passes said reference level within said prescribed time is smaller than said prescribed number at the time of starting of said synchronous machine starting device.

4. The synchronous machine starting device according to claim 1, wherein
   said selector circuit initially selects said first position signal for output to said power conversion control portion, and then selects said second position signal for output to said power conversion control portion.

5. The synchronous machine starting device according to claim 1, wherein
   said rotor position detection unit further includes an AC signal generation unit for outputting a third position signal that is an AC signal having said initial frequency and having a phase adjusted to be synchronized with said first position signal, and said selector circuit selects said first position signal, said third position signal, and said second position signal in this order, for output to said power conversion control portion.

6. The synchronous machine starting device according to claim 1, wherein
   said rotor position detection unit further includes an AC signal generation unit for outputting a third position signal that is an AC signal having said initial frequency and having a phase adjusted to be synchronized with said first position signal, and
   said selector circuit initially selects said third position signal for output to said power conversion control portion, and then selects said second position signal for output to said power conversion control portion.

7. The synchronous machine starting device according to claim 1, wherein
said rotor position detection unit further includes an AC signal generation unit for outputting a third position signal that is an AC signal having said initial frequency and having a phase adjusted to be synchronized with said first position signal,
where an absolute value of said detected AC voltage is a prescribed value or higher at the time of starting of said synchronous machine starting device, said selector circuit initially selects said first position signal for output to said power conversion control portion, and then selects said second position signal for output to said power conversion control portion, and
where the absolute value of said detected AC voltage does not reach said prescribed value within a prescribed time at the time of starting of said synchronous machine starting device, said selector circuit selects said first position signal, said third position signal, and said second position signal in this order, for output to said power conversion control portion.

8. The synchronous machine starting device according to claim 1, wherein
said rotor position detection unit further includes an AC signal generation unit for outputting a third position signal that is an AC signal having said initial frequency and having a phase adjusted to be synchronized with said first position signal,
where the number of times that the value of said detected AC voltage passes said reference level within a prescribed time is a prescribed number or greater at the time of starting of said synchronous machine starting device, said selector circuit initially selects said first position signal for output to said power conversion control portion, and then selects said second position signal for output to said power conversion control portion, and
where the number of times that the value of said detected AC voltage passes said reference level within said prescribed time is smaller than said prescribed number at the time of starting of said synchronous machine starting device, said selector circuit selects said first position signal, said third position signal, and said second position signal in this order, for output to said power conversion control portion.

9. The synchronous machine starting device according to claim 4, wherein
said selector circuit selects said second position signal when the number of times that the value of said detected AC voltage passes said reference level within a prescribed time has exceeded a prescribed number.

10. The synchronous machine starting device according to claim 4, wherein
said selector circuit selects said second position signal when a prescribed time has elapsed since an absolute value of said detected AC voltage reaches a prescribed value or higher.

11. The synchronous machine starting device according to claim 5, wherein
said selector circuit selects said third position signal when a prescribed time has elapsed since an absolute value of said detected AC voltage reaches a prescribed value or higher.

12. The synchronous machine starting device according to claim 4, wherein
said rotor position detection unit further includes a switching circuit for switching whether or not to output said first position signal to said feedback operation unit,
said feedback operation unit adjusts a phase of said second position signal based on said first position signal received from said switching circuit, and
said selector circuit selects said second position signal after said feedback operation unit has adjusted the phase of said second position signal based on said first position signal.

13. The synchronous machine starting device according to claim 5, wherein
said rotor position detection unit further includes a first switching circuit for switching whether or not to output said first position signal to said AC signal generation unit,
said AC signal generation unit adjusts a phase of said third position signal based on said first position signal received from said first switching circuit, and
said selector circuit selects said third position signal after said AC signal generation unit has adjusted the phase of said third position signal based on said first position signal.

14. The synchronous machine starting device according to claim 13, wherein
said rotor position detection unit further includes a second switching circuit for switching whether or not to output said third position signal to said feedback operation unit,
said feedback operation unit adjusts a phase of said second position signal based on said third position signal received from said second switching circuit, and
said selector circuit selects said second position signal after said feedback operation unit has adjusted the phase of said second position signal based on said third position signal.

15. The synchronous machine starting device according to claim 5, wherein
said selector circuit selects said second position signal when the number of times that the value of said detected AC voltage passes said reference level within a prescribed time has exceeded a prescribed number.

16. The synchronous machine starting device according to claim 6, wherein
said selector circuit selects said second position signal when the number of times that the value of said detected AC voltage passes said reference level within a prescribed time has exceeded a prescribed number.

17. The synchronous machine starting device according to claim 5, wherein
said selector circuit selects said second position signal when a prescribed time has elapsed since an absolute value of said detected AC voltage reaches a prescribed value or higher.

18. The synchronous machine starting device according to claim 6, wherein
said selector circuit selects said second position signal when a prescribed time has elapsed since an absolute value of said detected AC voltage reaches a prescribed value or higher.

19. The synchronous machine starting device according to claim 6, wherein
said rotor position detection unit further includes a first switching circuit for switching whether or not to output said first position signal to said AC signal generation unit, said AC signal generation unit adjusts a phase of said third position signal based on said first position signal received from said first switching circuit, and said selector circuit selects said third position signal after said AC signal generation unit has adjusted the phase of said third position signal based on said first position signal.

20. The synchronous machine starting device according to claim 19, wherein said rotor position detection unit further includes a second switching circuit for switching whether or not to output said third position signal to said feedback operation unit, said feedback operation unit adjusts a phase of said second position signal based on said third position signal received from said second switching circuit, and said selector circuit selects said second position signal after said feedback operation unit has adjusted the phase of said second position signal based on said third position signal.

* * * * *